United States Patent
Rosqvist

(10) Patent No.: US 11,134,283 B2
(45) Date of Patent: Sep. 28, 2021

(54) SYSTEMS AND METHODS FOR STORING A MEDIA ASSET RESCHEDULED FOR TRANSMISSION FROM A DIFFERENT SOURCE

(71) Applicant: Rovi Guides, Inc., San Carlos, CA (US)

(72) Inventor: Sean William Rosqvist, Kaysville, UT (US)

(73) Assignee: Rovi Guides, Inc., San Jose, CA (US)

( * ) Notice: Subject to any disclaimer, the term of this patent is extended or adjusted under 35 U.S.C. 154(b) by 17 days.

(21) Appl. No.: 15/239,336

(22) Filed: Aug. 17, 2016

(65) Prior Publication Data
US 2018/0054639 A1    Feb. 22, 2018

(51) Int. Cl.
| | |
|---|---|
| *H04N 21/2343* | (2011.01) |
| *H04N 5/765* | (2006.01) |
| *H04N 21/433* | (2011.01) |
| *H04N 21/231* | (2011.01) |
| *H04N 21/262* | (2011.01) |

(Continued)

(52) U.S. Cl.
CPC ... *H04N 21/23439* (2013.01); *G06F 16/7867* (2019.01); *H04N 5/765* (2013.01); *H04N 21/231* (2013.01); *H04N 21/232* (2013.01); *H04N 21/2402* (2013.01); *H04N 21/262* (2013.01); *H04N 21/278* (2013.01); *H04N 21/432* (2013.01); *H04N 21/433* (2013.01); *H04N 21/4343* (2013.01); *H04N 21/4345* (2013.01); *H04N 21/44029* (2013.01); *H04N 21/44209* (2013.01); *H04N 21/458* (2013.01);

(Continued)

(58) Field of Classification Search
CPC ........... H04N 21/4325; H04N 21/4334; H04N 21/43622; H04N 5/765; H04N 21/231; H04N 21/232; H04N 21/2402; H04N 21/262; H04N 21/23439; G06F 16/7867
USPC .......................................... 725/93, 116, 146
See application file for complete search history.

(56) References Cited

U.S. PATENT DOCUMENTS

| | | | |
|---|---|---|---|
| 6,208,799 B1 * | 3/2001 | Marsh ................ | H04N 5/44543 348/E5.007 |
| 6,681,396 B1 * | 1/2004 | Bates ..................... | H04N 5/782 386/E5.043 |

(Continued)

FOREIGN PATENT DOCUMENTS

EP    2461599    6/2012

*Primary Examiner* — Jefferey F Harold
*Assistant Examiner* — Franklin S Andramuno
(74) *Attorney, Agent, or Firm* — Haley Guiliano LLP

(57) ABSTRACT

Systems and methods for efficiently determining that a media asset scheduled to be stored from one content source has been rescheduled to another content source. For example, by examining the contents of data packets received with a media asset which identify the media asset currently being received (e.g., a field in an event information table), a media guidance application executed on a set-top box or other user equipment device may determine in real-time that the media asset scheduled to be stored is not currently being transmitted from the originally-scheduled content source. In response to determining the media asset is not available from the originally-scheduled content source, the media guidance application may search through packets received from other content sources to determine a content source the media asset has been rescheduled to and store the media asset from that content source.

20 Claims, 9 Drawing Sheets

(51) Int. Cl.
  *H04N 21/432* (2011.01)
  *H04N 21/434* (2011.01)
  *H04N 21/4402* (2011.01)
  *H04N 21/8352* (2011.01)
  *H04N 21/845* (2011.01)
  *G06F 16/78* (2019.01)
  *H04N 21/232* (2011.01)
  *H04N 21/24* (2011.01)
  *H04N 21/278* (2011.01)
  *H04N 21/442* (2011.01)
  *H04N 21/458* (2011.01)
  *H04N 21/8547* (2011.01)

(52) U.S. Cl.
  CPC ..... *H04N 21/8352* (2013.01); *H04N 21/8456* (2013.01); *H04N 21/8547* (2013.01)

(56) References Cited

U.S. PATENT DOCUMENTS

| | | |
|---|---|---|
| 6,795,639 B1 | 9/2004 | Lord |
| 8,085,809 B2* | 12/2011 | Inoishi .................. H04L 65/103 370/401 |
| 9,374,553 B2 | 6/2016 | Berry et al. |
| 9,973,785 B1* | 5/2018 | Yang .................. H04N 21/2187 |
| 2007/0233602 A1* | 10/2007 | Zweig .................... G06F 21/10 705/51 |
| 2008/0141317 A1 | 6/2008 | Radloff et al. |
| 2012/0304234 A1* | 11/2012 | Carbunar ........... H04N 21/2225 725/93 |
| 2013/0156400 A1* | 6/2013 | Kummer ................ H04N 5/782 386/241 |
| 2013/0216207 A1 | 8/2013 | Berry et al. |
| 2014/0082672 A1 | 3/2014 | Casey et al. |
| 2014/0270680 A1* | 9/2014 | Bloch ..................... G11B 27/11 386/201 |
| 2014/0331260 A1* | 11/2014 | Gratton ............ H04N 21/4312 725/40 |
| 2015/0040172 A1* | 2/2015 | Zelesko ............ H04N 21/4622 725/110 |
| 2015/0319480 A1 | 11/2015 | Roe |
| 2015/0339396 A1* | 11/2015 | Ayers ..................... G09B 5/067 707/734 |
| 2016/0210050 A1* | 7/2016 | Hyun .................... G06F 3/0611 |
| 2016/0323482 A1* | 11/2016 | Chung ................ H04N 5/9265 |
| 2017/0085937 A1* | 3/2017 | Russ .................. H04N 21/26283 |
| 2017/0094330 A1 | 3/2017 | Maughan et al. |
| 2018/0132000 A1* | 5/2018 | Radloff ................ H04N 21/482 |

* cited by examiner

SYSTEMS AND METHODS FOR STORING A MEDIA ASSET RESCHEDULED FOR TRANSMISSION FROM A DIFFERENT SOURCE

BACKGROUND

Given the wide variety and number of content sources through which media can be delivered to consumers, content providers often move programming to different content sources to optimize the number of viewers viewing their content. For example, a content provider may schedule one program on a specialty cable channel (e.g., NBCSN), but due to greater interest in the program than anticipated by the content provider (e.g., a large social media following), it may be transmitted nationally on a content source more viewers receive (e.g., on NBC) and/or at a different time. In this situation where the schedule change (e.g., the program has moved to a different channel and/or time) is determined well before the program is scheduled to begin, content providers may update a program listings database which is then conferred to a set-top box or other user device (e.g., downloaded from the program listings database) to ensure the user is informed of the correct content available. If a user has scheduled the program to be stored, a set-top box with recording capabilities may automatically store the program from the correct source based on the received schedule change information. However, a second situation exists where a particular program is rescheduled or "bumped" to a different channel in real-time, which is common in sporting events scheduled back-to-back.

In the situation where a given program is bumped to a different channel in real-time (as the program airs or is about to begin), the content provider may not have enough time to update a program listing database as described above. Particularly, conventional systems incur a substantial lag time while the database is updated and the updates are downloaded to the set-top box. This lag time results in a set-top box failing to store a segment, or perhaps the entirety, of the program. In order to alleviate the lag time, some systems use object and speech recognition to determine that a schedule change for a program has occurred in real-time based on the content of the program (e.g., the announcers saying that because a sporting event has run long, the beginning of the next scheduled sporting event will be on a different channel). However, such systems are computationally intensive and even when well-calibrated are not always accurate. Additionally, these systems are dependent on the information presented by the announcers/on the screen; they may be unable to determine a schedule change if the announcers fail to mention it.

SUMMARY

Accordingly, systems and methods are presented for determining that a media asset scheduled to be stored from one content source has been rescheduled to another content source. The systems and methods may be used to more efficiently determine that a media asset has been rescheduled and the source the media asset has been rescheduled to. For example, by examining the contents of data packets received with a media asset which identify the media asset currently being received (e.g., a field in an event information table), a media guidance application executed on a set-top box or other user equipment device may determine in real-time that the media asset scheduled to be stored is not currently being transmitted from the originally-scheduled content source. In response to determining the media asset is not available from the originally-scheduled content source, the media guidance application may search through packets received from other content sources to determine a content source the media asset has been rescheduled to and store the media asset from that content source. In some embodiments, the media guidance application selectively chooses which content sources to search first based on their similarity to the originally-scheduled content source (e.g., if the program was originally-scheduled on ESPN, ESPN2 may be among the first searched content sources).

In some aspects, the media guidance application receives a user request to store a first media asset from a first content source of a plurality of content sources during a scheduled time interval. For example, the media guidance application may receive a user selection of an option to store a particular football game "Michigan v. USC" via a user input interface (e.g., a remote) from the channel "ESPN" from 4-6 pm. The user may select the option to store the football game in a program listing screen (e.g., in a grid guide), through a series recording option for all football games of a specific team, remotely from the set-top box using a mobile device, or any other method for selecting programs to be stored.

The media guidance application then stores the user request to store the first media asset from the first content source during the scheduled time interval as an entry in a data structure, wherein the entry includes a first field indicating a current content source. For example, the media guidance application may maintain a database of media assets and scheduled intervals when the media assets are scheduled for transmission that the user has requested to store, which may be located locally in storage or remotely accessible via a communications network. As a specific example, the database may be arranged in a table where each row contains in separate cells (i.e., fields) an identifier of the media asset scheduled for storage, a start time, an end time, and a content source the media asset is available from (i.e., the current content source). The media guidance application may read/write this information by executing a database query language script, such as an SQL script. For example, the media guidance application may update the field containing the current content source to be a different content source if the media guidance application determines the first media asset was rescheduled to the different content source, as described further below.

The media guidance application then monitors, during the scheduled time interval, data packets received together with video from the first content source. For example, upon determining that the scheduled time interval has begun for the media asset (e.g., it is 4 pm), the media guidance application may execute a program script to check data packets received from the first content source (e.g., ESPN) to determine whether the football game is currently available from the first content source (e.g., the football game is airing on ESPN).

The media guidance application extracts a first media asset indicator from the monitored data packets. For example, the media guidance application may extract, by executing an SQL script utilizing the declarative "Select" command, the media asset indicator from a field in a table transmitted in a data packet with the audiovisual data for the media asset. The identifier is unique to the first media asset allowing the media guidance application to differentiate it from other media assets, and it may be a name of the media asset, or an automatically hashed integer based on the scheduled transmission time from the content source. In some embodiments, the media guidance application receives a table containing information related to the video from the first content source. For example, the table may be organized into rows containing metadata relating to the program currently being received from a first content source, such as an indicator of the program (e.g., a unique alphanumeric code corresponding to the program) and a description of the program. The media guidance application then may retrieve a value from a field in the table corresponding to the first media asset indicator. For example, as described above, the media guidance application may retrieve an indicator, such as "FTBL1485."

The media guidance application compares the extracted first media asset indicator to an identifier of the first media asset. For example, the media guidance application may access a database containing identifiers of media assets and determine (e.g., via character matching) whether the media asset indicator extracted from the media asset stream matches an identifier of the first media asset stored in the database. In some embodiments, the media guidance application stores, with the user request, the identifier of the first media asset. For example, when the media guidance application receives a user selection to store the football game, the media guidance application stores an identifier of the football game which may be from the content source providing the football game. The media guidance application may compare the characters of the identifier of the first media asset with the characters of the extracted first media asset indicator. For example, the media guidance application may compare each character of the extracted indicator, such as "FTBL1485," with the stored identifier. The media guidance application may determine that the extracted indicator matches the stored identifier if a threshold number or percentage of characters match.

The media guidance application, in response to determining that the extracted media asset indicator does not correspond to the identifier of the first media asset, searches data packets received on the plurality of content sources for a second data packet that includes a second media asset indicator that corresponds to the identifier of the first media asset. For example, the media guidance application may determine that the football game scheduled to air at 4 pm on ESPN is not currently airing based on the extracted indicator from the media asset currently received from ESPN not matching the identifier of the football game (e.g., based on comparison with the database as described above). In response to this determination, the media guidance application may scan through other content sources to which the user subscribes in an attempt to find a content source where the media asset is available by extracting indicators from data packets and comparing the extracted indicators to the identifier of the media asset, as described above.

In some embodiments, when searching the data packets received on the plurality of content sources for the second data packet, the media guidance application accesses a database containing information for a plurality of content sources, wherein the information includes indications of subsets of the plurality of content sources that are similar to each content source of the plurality of content sources. For example, the media guidance application may access the database stored locally in memory or remotely at a media guidance data source accessible via a communications network. The database may be designed in a self-referencing manner, where identifiers and information for each content source may be contained non-contiguously in a single table and linked via pointers to the appropriate fields corresponding to similar content sources in the table. The media guidance application then retrieves an indication from a field in the database associated with the first content source that the second content source is similar to the first content source. For example, the media guidance application may execute a database query language script, such as an SQL script, which retrieves, (e.g., via the declarative "Select" statement) an identifier of a second content source from a field associated with the first content source. The media guidance application then searches data packets from the second content source for the second media asset indicator that corresponds to the identifier of the first media asset. For example, as described above, the media guidance application extracts an indicator of the media asset currently being transmitted from the second content source and determines whether it matches the identifier of the first media asset.

The media guidance application, in response to determining that the second data packet received from a second content source of the plurality of content sources includes the second media asset indicator that corresponds to the identifier of the first media asset, updates the current content source in the first field of the stored entry to indicate that the first media asset is being transmitted from the second content source. For example, upon determining from the extracted data packets from the content source "ESPN2" that the football game is airing on ESPN2 instead of ESPN, the media guidance application may update the field corresponding to the current content source in the entry stored in the data structure to reflect that the football game is airing from the different content source, ESPN2. As a specific example, the media guidance application may execute a program script to update the value stored in the first field associated with the stored entry for the football game.

The media guidance application stores the first media asset from the current content source indicated in the first field of the stored entry. For example, the media guidance application may store the football game from ESPN2 instead of ESPN based on the updated current content source value stored in the first field of the entry in the database. In some embodiments, the media guidance application may continue to monitor the data packets of the media asset currently being received from the second content source to determine whether the first media asset has been scheduled back to the first content source, or another content source. For example, the reason the football game was rescheduled to ESPN2 may be because a sporting event on ESPN scheduled to end at 4 pm ran long. In this situation, while storing from the second content source (e.g., ESPN2) the media guidance application may continue to monitor whether the football game is still being received on ESPN2. After ten minutes, the game on ESPN may finish and the "Michigan v. USC" football game may be scheduled back to ESPN from ESPN2. By continuing to monitor the media asset indicator received with the audiovisual data of the media asset during the scheduled time interval, the media guidance application can detect a content source change at any time and find and store the media asset from the content source on which it is currently available.

In some embodiments, the media guidance application checks whether the media asset scheduled to be stored has run longer than its scheduled timeslot, and/or started before its scheduled timeslot. The media guidance application, during a first time interval outside of the scheduled time interval, monitors the data packets received together with the video from the first content source. For example, the media guidance application may monitor the data packets received with the video from the first content source at a set time before the program is scheduled to begin, which may be user-customizable (e.g., 30 minutes before the media asset is scheduled to begin). As an illustrative example, the media guidance application may capture pre-game footage or information if a sporting event scheduled to end at 4 pm ends earlier than expected. Alternatively or additionally, the media guidance application monitors the data packets received with the video from the first content source after the scheduled end time of the media asset. For example, the first media asset scheduled to be stored may itself run past the scheduled end time. In this situation, the media guidance application may continue to monitor data packets received from the first content source as described above and continue to store the media asset until the data packets received with the video from the first content source no longer match the identifier of the media asset (e.g., indicating that the media asset has ended). Alternatively or additionally, the media guidance application may determine that the media asset has ended and not been rescheduled to another content source by searching the plurality of content sources as described above at the end or after the scheduled time interval.

In some embodiments, the media asset may be stored in multiple segments from different content sources. For example, a football game may begin on ESPN2, but be moved to ESPN after five minutes because the program that ran long on ESPN is over. In such a situation, the media guidance application stores a first segment of the media asset from the second content source, as discussed above. For example, the media guidance application may store the football game received from ESPN2 at the start of the game, instead of ESPN as originally-scheduled. The media guidance application then stores a second segment of the first media asset received from the first content source. For example, the media guidance application determines, using the methods discussed above, that the football game has been scheduled back to ESPN and stores a second segment of the football game received from ESPN. The media guidance application then stitches, into a single stored file, the first segment and the second segment. For example, the media guidance application combines the two stored segments of the football game such that a single stored file for the entire game can be accessed by the user. The media guidance application additionally stores, in the single stored file, an indication that the single stored file was created from the first content source and the second content source. For example, the media guidance application may store the indication that the stored file was made from multiple content sources so that the user is alerted to that fact.

In some embodiments, when stitching together two stored segments, the media guidance application extracts a first time stamp for the first segment from metadata stored with the first segment. For example, the media guidance application may extract that the first segment was stored starting at "19:00:00" (HH:MM:SS). The media guidance application extracts a second time stamp for the second segment from metadata stored with the second segment. For example, the media guidance application may extract that the second segment was stored starting at "19:05:00" (HH:MM:SS). The media guidance application then compares the first time stamp and the second time stamp to determine which is earlier. For example, the media guidance application may determine based on subtracting the two extracted time stamps which is earlier based on whether the result obtained from the subtraction is positive or negative. The media guidance application, in response to determining the first time stamp is earlier, adds the second segment to the end of the first segment. For example, the media guidance application stitches the beginning of the second segment stored from ESPN to the end of the first segment stored from ESPN2 of the football game.

In some embodiments, the media guidance application compares a duration of the stored first media asset to the scheduled time interval. For example, the media guidance application may determine that the stored football game has a duration of one hour and compare this to the scheduled time interval for the football game, which may be two hours. The media guidance application, in response to determining the duration of the stored media asset is shorter than the scheduled time interval, compares the difference between the duration of the stored media asset and the scheduled time interval to a threshold difference. For example, the media guidance application may determine that the stored football game is shorter than the scheduled interval for the football game and that the difference (e.g., an hour) is greater than a threshold difference (e.g., 5 minutes). The media guidance application, in response to determining the difference between the duration of the stored media asset and the scheduled time interval meets the threshold difference, determines that the stored first media asset is not complete. For example, the media guidance application determines that since there is a one hour difference between the scheduled interval and what was actually stored, which is greater than the threshold difference, that the stored football game is not complete.

In some embodiments, in response to determining the difference between the duration of the stored media asset and the scheduled time interval meets the threshold difference, the media guidance application additionally determines, from media asset listings retrieved from a media guidance database, whether the first media asset is available at a future time. For example, the media guidance application may determine that a portion of the football game (e.g., one hour) may not have been stored which exceeds the threshold (e.g., five minutes), and then retrieve listings from a media guidance data source to determine whether a media asset is available at a future time (e.g., a re-run). The media guidance application may compare the characters of the identifier of the media asset with individual listings to make the determination that the media asset is available at a future time. The media guidance application, in response to determining the first media asset is available at a future time from a third content source, stores a second request to store the first media asset from the third content source (e.g., in a data structure such as a table, as discussed above). For example, the media guidance application may determine that the media asset is available from a third content source, which may be the first, second, or a different content source, and schedule a request to store the media asset from the third content source (e.g., ABC). By scheduling the re-run of the media asset, the media guidance application may be able to determine whether the original stored media asset was complete (e.g., it ended earlier than its scheduled interval) or whether it was missing a portion of the media asset.

In some embodiments, the media guidance application stores only a portion of the media asset scheduled at a future time. The media guidance application retrieves, from metadata stored for each frame of a plurality of frames of the stored media asset, times associated with each frame of the plurality of frames. For example, each frame received and stored by the media guidance application may have associated metadata with a time the frame was transmitted from the content source (e.g., in the format HH:MM:SS:FF, where FF is the frame number). The media guidance application may determine that a portion of the first media asset is missing between a first frame and a second frame. For example, the media guidance application may detect that after a frame with an associated time 19:05:00:01, the next frame has an associated time 19:10:00:01, and the media guidance application may determine that a portion (e.g., five minutes of the media asset) is missing from the stored media asset. The media guidance application may then store, with the second request, an instruction to only store the first portion of the first media asset. For example, in order to create a complete version of the media asset without storing the whole media asset over again, which may be storage intensive, the media guidance application stores an instruction to only store the frames of the media asset that are missing from the stored first media asset (e.g., the first portion).

It should be noted the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are presented for determining that a media asset scheduled to be stored from one content source has been rescheduled for transmission from another content source. The systems and methods may be used to more efficiently determine that a media asset has been rescheduled and the source from which the media asset has been rescheduled to be transmitted. For example, by examining the contents of data packets received with a media asset which identify the media asset currently being received (e.g., a field in an event information table), a media guidance application executed on a set-top box or other user equipment device may determine in real-time that the media asset scheduled to be stored is not currently being transmitted from the originally-scheduled content source. In response to determining the media asset is not available from the originally-scheduled content source, the media guidance application may search through packets received from other content sources to determine a content source the media asset has been rescheduled to and store the media asset from that content source. In some embodiments, the media guidance application selectively chooses which content sources to search first based on their similarity to the originally-scheduled content source (e.g., if the program was originally scheduled on ESPN, ESPN2 may be among the first searched content sources that is searched).

As referred to herein, a "media guidance application," or an "interactive media guidance application" or, sometimes, a "media guidance application" or a "guidance application" is an application that allows a user to consume, and/or navigate to, media assets. In some embodiments, the media guidance application may be provided as an online application (i.e., provided on a website), or as a stand-alone application on a server, user device, etc. In some embodiments, the media guidance application may be executed on the first device and a second device simultaneously, or at a location remote from either device (e.g., a remote server), or any suitable combination. In some embodiments, control circuitry installed on various devices and platforms may execute the media guidance application, as described in more detail below. In some embodiments, the media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and nonvolatile computer memory or storage devices such as a hard disk, floppy disk, USB drive, DVD, CD, media card, register memory, processor caches, Random Access Memory ("RAM"), etc.

Figure 1:
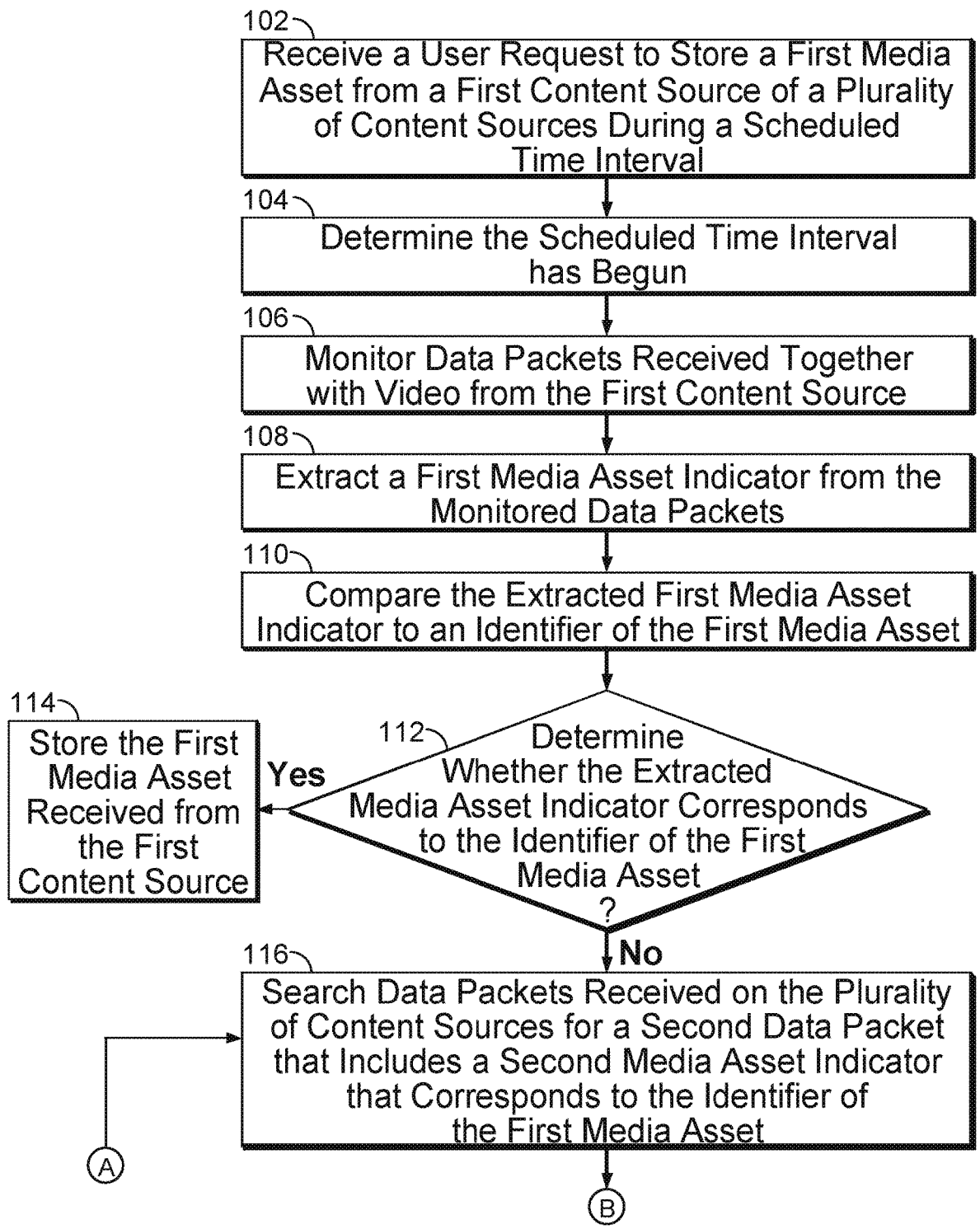
FIG. 1 is a flowchart of illustrative steps for determining that a media asset scheduled to be stored from one content source has been rescheduled for transmission from another content source, in accordance with some embodiments of the disclosure.
Figure 1:
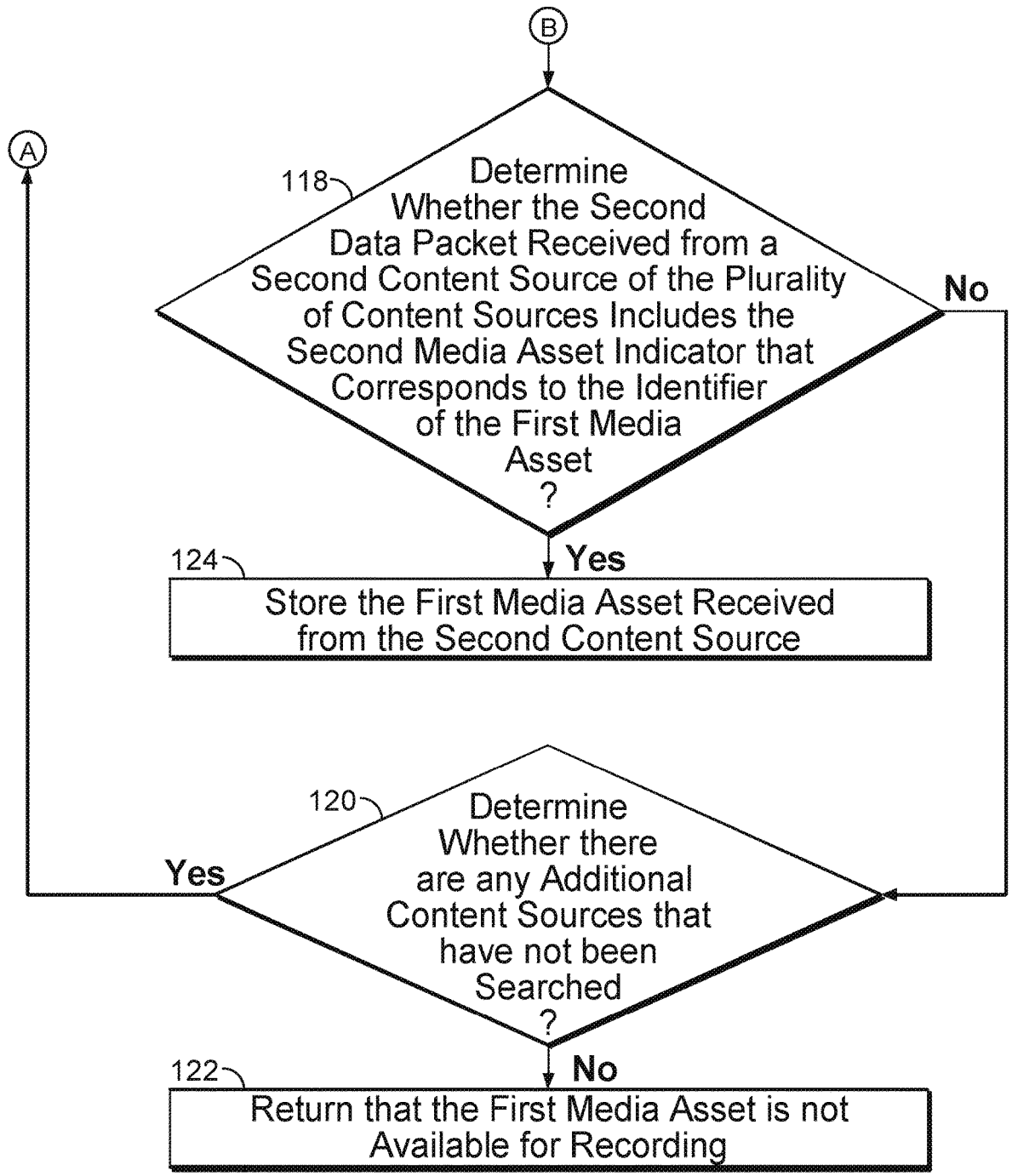
Figure 5:
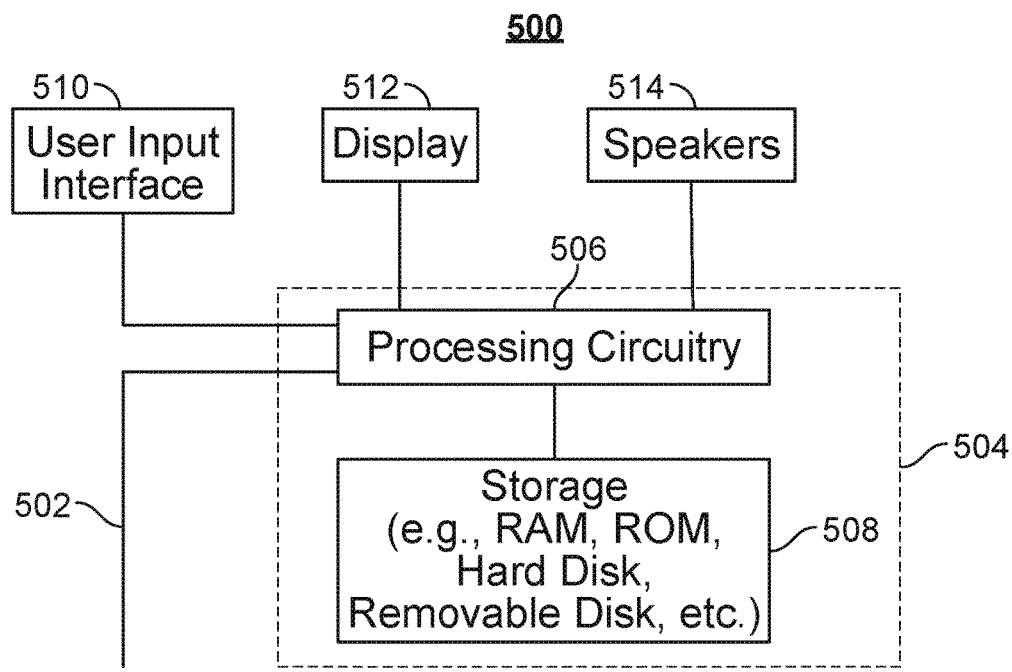
FIG. 5 is a block diagram of an illustrative user equipment device in accordance with some embodiments of the disclosure.

FIG. 1 is a flowchart of illustrative steps for adjusting output of media assets based on user preferences, in accordance with some embodiments of the disclosure. For example, a media guidance application implementing process 100 may be executed by control circuitry 504 (FIG. 5). It should be noted that process 100 or any step thereof could be performed on, or provided by, any of the devices shown in FIGS. 5-6.

Process 100 begins at 102, where the media guidance application receives (e.g., via control circuitry 504 (FIG. 5)) a user request to store a first media asset from a first content source of a plurality of content sources during a scheduled time interval. For example, the media guidance application (e.g., via control circuitry 504 (FIG. 5)) may receive a user selection of an option to store a particular football game "Michigan v. USC" via a user input interface (e.g., via user input interface 510 (FIG. 5)) from the channel "ESPN" from 4-6 pm. The user may select the option to store the football game in a program listing screen (e.g., in a grid guide (FIGS. 3-4)), through a series recording option for all football games of a specific team, remotely from the set-top box using a mobile device, or any other method for selecting programs to be stored. As referred to herein, "store" should be understood to mean any methods or systems for preserving a media asset persistently, such that a user can access the media asset after its original transmission. In some embodiments, storing a media asset may be performed by a set-top box or other user equipment recording the media asset from the content source transmitting the media asset. In other embodiments, storing a media asset may be performed by downloading a copy of the media asset from a remote server via a communications network.

Process 100 continues to 104, where the media guidance application determines (e.g., via control circuitry 504 (FIG. 5)) the scheduled time interval has begun. For example, the media guidance application may determine (e.g., via control circuitry 504 (FIG. 5)) from an internal clock (e.g., in a user equipment device as described in FIGS. 5-6) the current time. The media guidance application (e.g., via control circuitry 504 (FIG. 5)) may then compare the current time to a start time of the scheduled time interval stored in a data structure for the first media asset to determine whether the current time matches the start time.

Process 100 continues to 106, where the media guidance application monitors (e.g., via control circuitry 504 (FIG. 5)) data packets received together with video from the first content source, which is described in detail in FIG. 7 below. For example, the media guidance application (e.g., via control circuitry 504 (FIG. 5)) may execute a program script to check data packets received from the first content source (e.g., ESPN) to determine whether the football game is currently available from the first content source (e.g., the football game is airing on ESPN). The media guidance application (e.g., via control circuitry 504 (FIG. 5)) may monitor the data packets continuously, or during predetermined intervals to reduce computational cost.

Process 100 continues to 108, where the media guidance application extracts (e.g., via control circuitry 504 (FIG. 5)) a first media asset indicator from the monitored data packets. For example, the media guidance application may extract (e.g., via control circuitry 504 (FIG. 5)), by executing an SQL script utilizing the declarative "Select" command, the media asset indicator from a field in a table transmitted in a data packet with the audiovisual data for the media asset. As referred to herein, a "media asset indicator" should be understood to mean any identifier that is unique to the first media asset allowing the media guidance application to differentiate it from other media assets. In some embodiments, the media asset indicator may be a name or title of the media asset in alphanumeric characters. In other embodiments, the media asset indicator may be an automatically-hashed integer based on the scheduled transmission time from the content source. In still other embodiments, the "media asset indicator" may be split include multiple components used by the media guidance application to determine what media asset is currently being transmitted. For example, the media guidance application may receive multiple fields of information (e.g., as in FIG. 2 below) and use more than just one field to determine what media asset is currently being transmitted.

In some embodiments, the media guidance application (e.g., via control circuitry 504 (FIG. 5)) receives a table containing information related to the video from the first content source. For example, the table may be organized into rows containing metadata relating to the program currently being received from a first content source, such as an indicator of the program (e.g., a unique alphanumeric code corresponding to the program) and a description of the program, as described further below in FIG. 2. The media guidance application then may retrieve a value from a field in the table corresponding to the first media asset indicator. For example, as described above, the media guidance application may retrieve an indicator, such as "FTBL1485."

Process 100 continues to 110, where the media guidance application compares (e.g., via control circuitry 504 (FIG. 5)) the extracted first media asset indicator to an identifier of the first media asset. For example, the media guidance application may access (e.g., via control circuitry 504 (FIG. 5)) a database containing identifiers of media assets, (e.g., stored locally in memory (e.g., storage 508), or remotely at a media guidance data source (e.g., media guidance data source 618) accessible via a communications network (e.g., communications network 614)) and determine (e.g., via character matching) whether the media asset indicator extracted from the media asset stream matches an identifier of the first media asset stored in the database.

In some embodiments, the media guidance application stores (e.g., via control circuitry 504 (FIG. 5)), with the user request, the identifier of the first media asset. For example, when the media guidance application receives (e.g., via control circuitry 504 (FIG. 5)) a user selection (e.g., from user input interface 510 (FIG. 5)) to store the football game, the media guidance application stores an identifier of the football game which may be from the content source providing the football game. The media guidance application may compare (e.g., via control circuitry 504 (FIG. 5)) the characters of the identifier of the first media asset with the characters of the extracted first media asset indicator. For example, the media guidance application may compare (e.g., via control circuitry 504 (FIG. 5)) each character of the extracted indicator, such as "FTBL1485," with the stored identifier. The media guidance application may determine (e.g., via control circuitry 504 (FIG. 5)) that the extracted indicator matches the stored identifier if a threshold number or percentage of characters match.

Process 100 continues to 112, where the media guidance application determines (e.g., via control circuitry 504 (FIG. 5)) whether the extracted media asset indicator corresponds to the identifier of the first media asset. For example, the media guidance application may execute (e.g., via control circuitry 504 (FIG. 5)) a program script which outputs whether the extracted indicator matches the stored identifier of the first media asset (e.g., "FTBL1485" is both the extracted indicator and the stored identifier). The media guidance application may receive (e.g., via control circuitry 504 (FIG. 5)) as an output of the executed program script a Boolean result based on whether the extracted indicator matches the stored identifier.

If the media guidance application determines the extracted media asset indicator corresponds to the identifier of the first media asset, process 100 continues to 114, where the media guidance application stores (e.g., via control circuitry 504 (FIG. 5)) the first media asset received from the first content source. For example, upon determining that the extracted identifier matches the stored identifier corresponding to the first media asset, the media guidance application may store (e.g., in storage 508 (FIG. 5)) the football game received from the originally-scheduled content source (e.g., ESPN). The media guidance application may continue to monitor (e.g., via control circuitry 504 (FIG. 5)) data packets received from the first content source throughout the scheduled time interval to determine whether the first media asset is no longer being transmitted from the first content source and is being transmitted from a different content source (e.g., process 100 may return to step 106).

If the media guidance application determines the extracted media asset indicator does not correspond to the identifier of the first media asset, process 100 continues to 116, where the media guidance application searches (e.g., via control circuitry 504 (FIG. 5)) data packets received on the plurality of content sources for a second data packet that includes a second media asset indicator that corresponds to the identifier of the first media asset. For example, the media guidance application may determine (e.g., via control circuitry 504 (FIG. 5)) that the football game scheduled to air at 4 pm on ESPN is not currently airing based on the extracted indicator from the media asset currently received from ESPN not matching the identifier of the football game (e.g., based on comparison with the database as described above). In response to this determination, the media guidance application may scan through other content sources (e.g., via control circuitry 504 (FIG. 5)) to which the user subscribes in an attempt to find a content source where the media asset is available by extracting indicators from data packets and comparing the extracted indicators to the identifier of the media asset, as described above.

Process 100 continues to 118, where the media guidance application determines (e.g., via control circuitry 504 (FIG. 5)) whether the second data packet received from a second content source of the plurality of content sources includes the second media asset indicator that corresponds to the identifier of the first media asset. For example, the media guidance application may extract (e.g., via control circuitry 504 (FIG. 5)) a media asset indicator (e.g., "FTBL1485") from a data packet received from the second content source and determine whether it matches (e.g., via character matching) the identifier of the first media asset stored in a data structure, as described above.

If the media guidance application determines the second data packet received from a second content source of the plurality of content sources includes the second media asset indicator that corresponds to the identifier of the first media asset, process 100 continues to 124, where the media guidance application stores (e.g., via control circuitry 504 (FIG. 5)) the first media asset received from the second content source. For example, the media guidance application may store (e.g., in storage 508 (FIG. 5)) the football game received from ESPN2 instead of ESPN based on determining from the data packet received from ESPN2 that the football game is being transmitted from that station.

If the media guidance application determines the second data packet received from a second content source of the plurality of content sources does not include the second media asset indicator that corresponds to the identifier of the first media asset, process 100 continues to 120, where the media guidance application determines (e.g., via control circuitry 504 (FIG. 5)) whether there are any additional content sources that have not been searched. For example, the media guidance application may execute (e.g., via control circuitry 504 (FIG. 5)) a program script containing a "for" loop that iteratively receives data packets containing media asset indicators from content sources that the user subscribes to and terminates when data packets containing media asset indicators from all the content sources have been checked. Alternatively or additionally, the media guidance application may maintain a list of content sources (e.g., in storage 508 (FIG. 5)) that data packets have been extracted from and determine whether any content sources subscribed to by the user have not yet been checked.

If the media guidance application determines there are not any additional content sources that have not been searched, process 100 continues to 122, where the media guidance application returns (e.g., via control circuitry 504 (FIG. 5)) that the first media asset is not available for storage. For example, the media guidance application may determine (e.g., via control circuitry 504 (FIG. 5)) that the football game is not being transmitted from any content source available to the user. Alternatively or additionally, upon making the determination that the football game is not being transmitted from any content source available to the user, the media guidance application may transmit (e.g., via communications network 614 (FIG. 6)) a notification to the user that the football game cannot be stored due to a schedule change.

If the media guidance application determines there are additional content sources that have not been searched, process 100 returns to 116, where the media guidance application searches (e.g., via control circuitry 504 (FIG. 5)) data packets received on the plurality of content sources that have not been searched for a second data packet that includes a second media asset indicator that corresponds to the identifier of the first media asset. For example, the media guidance application may continue to search (e.g., via control circuitry 504 (FIG. 5)) data packets received from different content sources for a media asset indicator that corresponds to the stored identifier of the football game, as described above.

It is contemplated that the steps or descriptions of FIG. 1 may be used with any other embodiment of this disclosure. In addition, the steps and descriptions described in relation to FIG. 1 may be done in alternative orders or in parallel to further the purposes of this disclosure. For example, each of these steps may be performed in any order or in parallel or substantially simultaneously to reduce lag or increase the speed of the system or method. For example, multiple instances of process 100 may be executed for multiple tuners in a set-top box which are each scheduled to receive different media assets for storage. Furthermore, it should be noted that any of the devices or equipment discussed in relation to FIGS. 5-6 could be used to perform one or more of the steps in FIG. 1.

Figure 2:
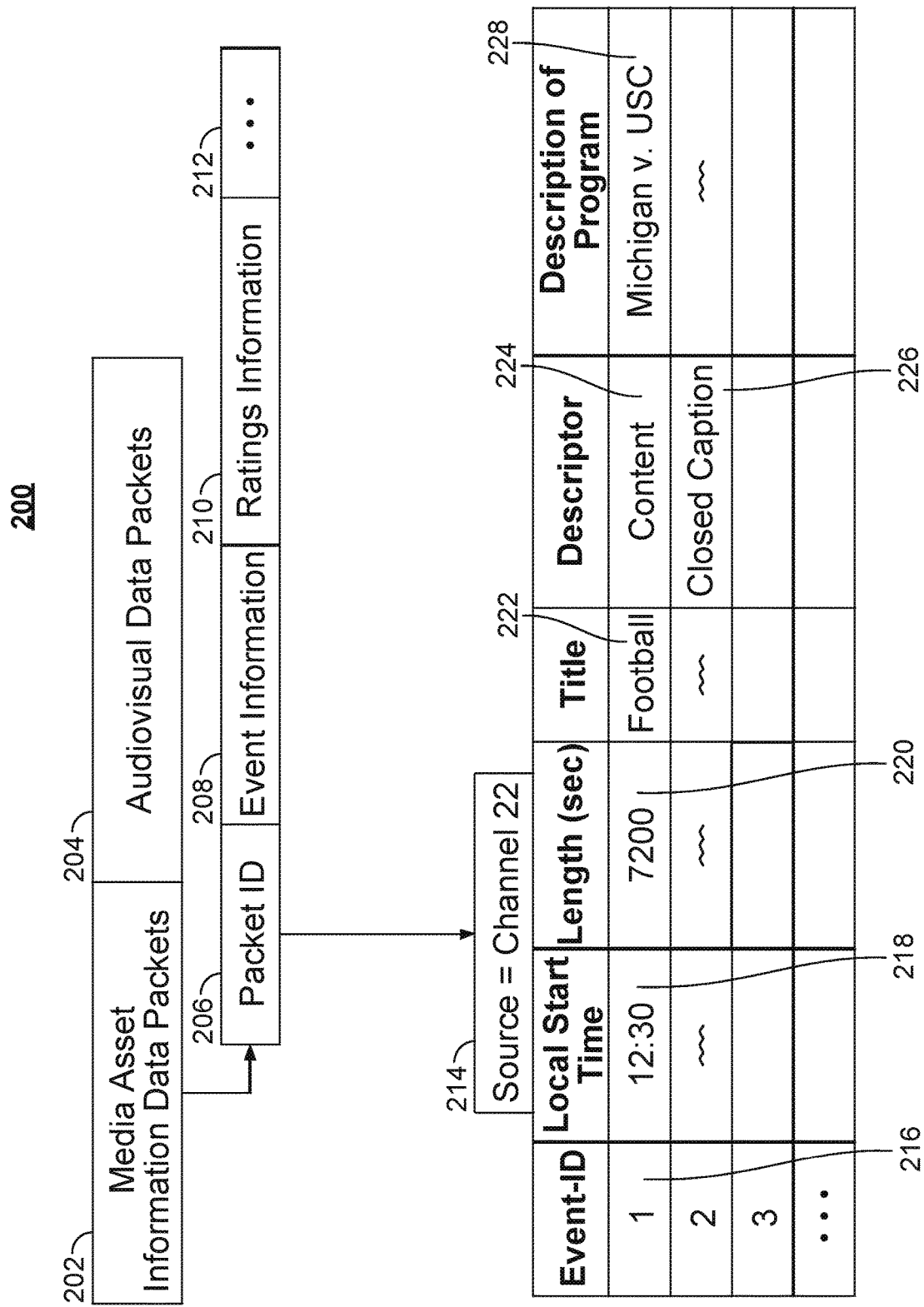
FIG. 2 shows an illustrative example of data packets received from a content source containing media asset information and audiovisual data, in accordance with some embodiments of the disclosure.

FIG. 2 shows an illustrative example of data packets received from a content source containing media asset information and audiovisual data, in accordance with some embodiments of the disclosure. For example, FIG. 2 shows data packets 200 received by the media guidance application from a content source (e.g., media content source 616 (FIG. 6)) containing various information relating to presentation of the program (e.g., media asset information data packets 202 and audiovisual data packets 204). For example, media asset information data packets 202 may contain textual information describing a media asset, its source, duration, etc. as described further below. Audiovisual data packets 204 may contain information that the media guidance application uses to output the program on a display screen (e.g., pixel color/brightness information, audio frequency and amplitude etc.).

Media asset information data packets may contain information on a media asset conforming to the Advanced Television Systems Committee, Inc.'s, "ATSC Recommended Practice: Program and System Information Protocol Implementation Guidelines for Broadcasters," which describes a consistent structural arrangement and format for data tables containing supplemental information to the audiovisual information of a media asset. As a general discussion, a particular packet of media asset information data packets 202 may contain packet ID 206. For example, packet ID 206 may be generated by hashing (e.g., a function that assigns an index value, such as an integer, to each packet) and may be an integer or string of characters that allows the media guidance application to reference the particular packet and map it to audiovisual data packets. This may allow the media guidance application to determine that a particular audiovisual data packet or set of data packets corresponds to particular media asset information (e.g., it allows the media guidance application to determine the media asset currently being transmitted). The particular packet of media asset information data packets 202 additionally contains event information 208 and ratings information 210. Additional information 212 relating to extended descriptions of programs, channels lists, or any other relevant information may also be contained in media asset information data packets 202.

Ratings information 210 may be arranged as a table where different ratings are matched with different populations that may be receiving the program. For example, a media guidance application may receive a program in Texas where the media asset is rated TV-14, as defined in the table for ratings information 210. The media guidance application may use this information for implementing parental control settings, i.e., locking programs for viewing by a user above a certain content rating unless they have a code or personal identification number to unlock the program.

Event information 208 contained in a media asset information data packet may be arranged in a table, as shown in FIG. 2. The content source 214 of the audiovisual data transmitted concurrently with the media asset information may be identified by a channel number, frequency, or other identifier (e.g., the name of the station such as "ESPN"). The table may be arranged based on event IDs, such as event ID 216, which indexes the information in the table based on its airtime and content. For example, event ID 216, with index "1" may refer to the currently airing program from content source 214, while an event ID with a greater index may refer to future scheduled programming. For each event ID, the table contains information on the local start time 218, such as "12:30." The time may be arranged in 12 hour format with an additional bit designated to distinguish AM from PM, or in 24 hour format. Each event ID also contains a length 220 of the media asset described by the particular event ID. The length may be relative to any length of time, although for ease a rounded integer value of seconds may be preferable to hours or days, which may require decimals.

Each event ID additionally contains a title, such as title 222, "Football." The title may be any combination of alphanumeric characters which identifies the media asset, although it may be limited to a certain number of bytes in the data packet for efficiency of transmission. Additional longer descriptions of the media asset (e.g., description of program 228) may in some cases be found for each event ID (e.g., a synopsis summarizing the content in a short paragraph). However, in some cases the field for description of program 228 may contain a pointer to another table containing the description, which may be in a separate data packet. Each event ID contains a descriptor informing the media guidance application what the particular event ID refers to. For example, event ID 216 may be describing descriptor 224, "content," since it contains information about the media asset itself. As another example, a different event ID may be describing data received out-of-band or non-audiovisual data from content source 214, such as descriptor 226, "closed caption."

In some embodiments, the media guidance application may receive a table containing information related to the video from the first content source. For example, the media guidance application may receive event information 208 arranged in a table as shown in FIG. 2. The media guidance application may then retrieve a value from a field in the table corresponding to the first media asset indicator. For example, the media guidance application may retrieve title 222 "Football" of event ID 216, which has an index of "1," since that represents the media asset currently being transmitted from content source 214. Alternatively or additionally, the media guidance application may retrieve data from the field corresponding to description of program 228 and use this data in conjunction with retrieved title 222 to ensure a more accurate determination of the media asset currently being transmitted from content source 214. For example, the media guidance application may determine that "Football—Michigan v. USC" is currently being transmitted from content source 214 based on retrieving title 222 "Football" and description of program 228, "Michigan v. USC." In this way, the media guidance application may extract additional information from the data packet for a more accurate determination of whether the first media asset indicator matches the identifier of the media asset.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 3:
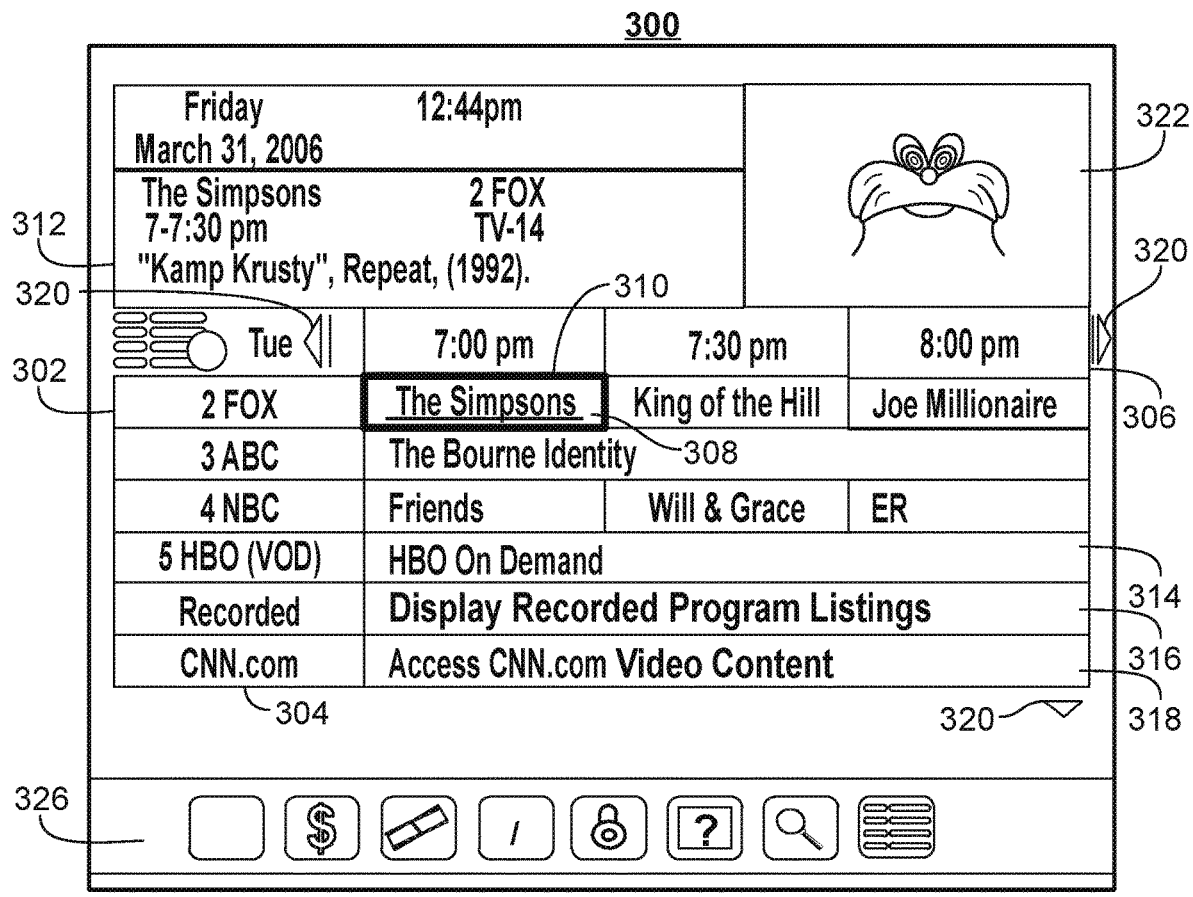
FIG. 3 shows an illustrative example of a display screen for use in accessing media content in accordance with some embodiments of the disclosure.
Figure 4:
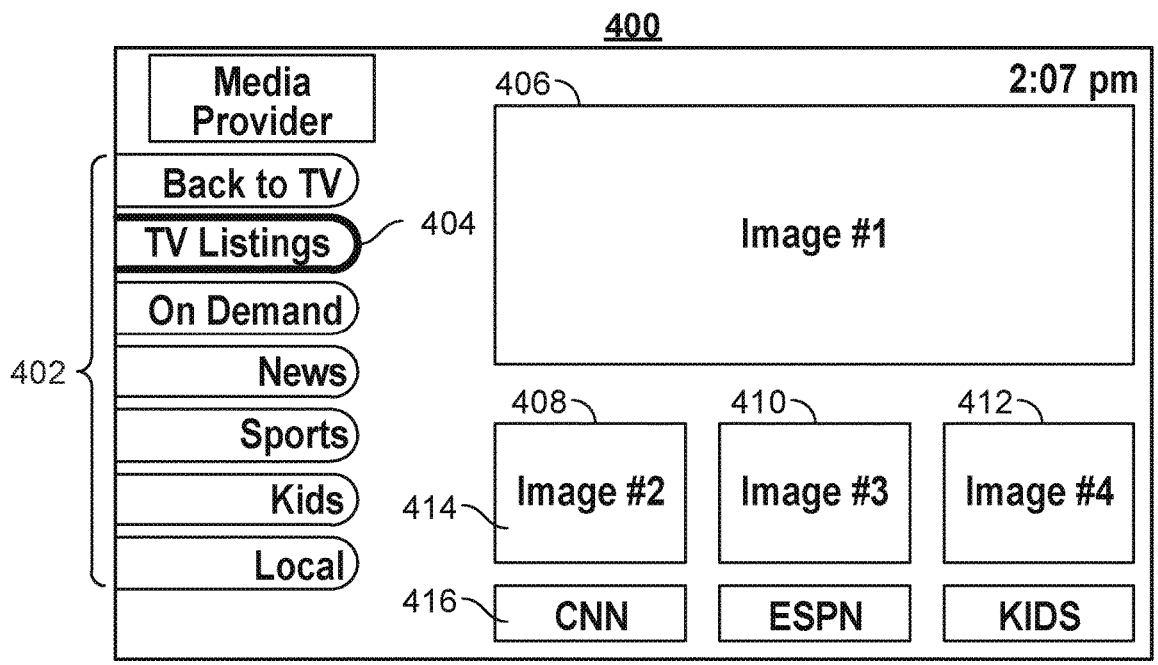
FIG. 4 shows another illustrative example of a display screen used access media content in accordance with some embodiments of the disclosure.

FIGS. 3-4 show illustrative display screens that may be used to provide media guidance data. The display screens shown in FIGS. 3-4 may be implemented on any suitable user equipment device or platform. While the displays of FIGS. 3-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 3 shows illustrative grid of a program listings display 300 arranged by time and channel that also enables access to different types of content in a single display. Display 300 may include grid 302 with: (1) a column of channel/content type identifiers 304, where each channel/content type identifier (which is a cell in the column) identifies a different channel or content type available; and (2) a row of time identifiers 306, where each time identifier (which is a cell in the row) identifies a time block of programming. Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 302 may provide media guidance data for non-linear programming including on-demand listing 314, recorded content listing 316, and Internet content listing 318. A display combining media guidance data for content from different types of content sources is sometimes referred to as a "mixed-media" display. Various permutations of the types of media guidance data that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In some embodiments, listings for these content types may be included directly in grid 302. Additional media guidance data may be displayed in response to the user selecting one of the navigational icons 320. (Pressing an arrow key on a user input device may affect the display in a similar manner as selecting navigational icons 320.)

Display 300 may also include video region 322, and options region 326. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 326 may allow the user to access different types of content, media guidance application displays, and/or media guidance application features. Options region 326 may be part of display 300 (and other display screens described herein), or may be invoked by a user by selecting an on-screen option or pressing a dedicated or assignable button on a user input device. The selectable options within options region 326 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 6. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 4. Video mosaic display 400 includes selectable options 402 for content information organized based on content type, genre, and/or other organization criteria. In display 400, television listings option 404 is selected, thus providing listings 406, 408, 410, and 412 as broadcast program listings. In display 400 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 408 may include more than one portion, including media portion 414 and text portion 416. Media portion 414 and/or text portion 416 may be selectable to view content in full-screen or to view information related to the content displayed in media portion 414 (e.g., to view listings for the channel that the video is displayed on).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Users may access content and the media guidance application (and its display screens described above and below) from one or more of their user equipment devices. FIG. 5 shows a generalized embodiment of illustrative user equipment device 500. More specific implementations of user equipment devices are discussed below in connection with FIG. 6. User equipment device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly-implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from user input interface 510. For example, movement of a cursor on a display up/down may be indicated by the processed instructions when user input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via user input interface 510 and transmit those inputs to the remote server for processing and generating the corresponding displays. For example, equipment device 500 may transmit a communication to the remote server indicating that an up/down button was selected via user input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
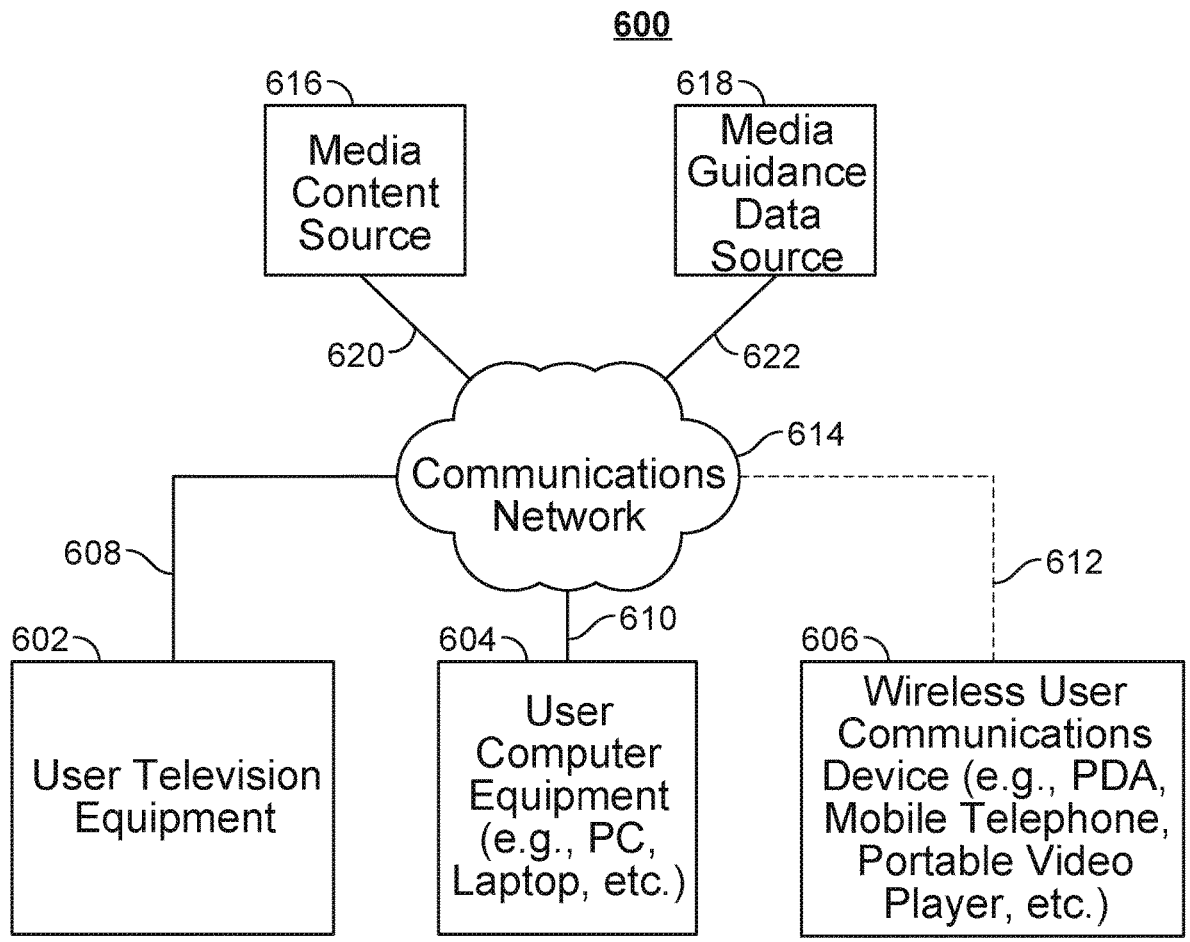
FIG. 6 is a block diagram of an illustrative media system in accordance with some embodiments of the disclosure.

User equipment device 500 of FIG. 5 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some television equipment 602, include a tuner allowing for access to television programming. The media guidance application may have the same layout on various different types of user equipment or may be tailored to the display capabilities of the user equipment. For example, on user computer equipment 604, the guidance application may be provided as a web site accessed by a web browser. In another example, the guidance application may be scaled down for wireless user communications devices 606.

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, wireless user communications device 606) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes content source 616 and media guidance data source 618 coupled to communications network 614 via communication paths 620 and 622, respectively. Paths 620 and 622 may include any of the communication paths described above in connection with paths 608, 610, and 612. Communications with the content source 616 and media guidance data source 618 may be exchanged over one or more communications paths, but are shown as a single path in FIG. 6 to avoid overcomplicating the drawing. In addition, there may be more than one of each of content source 616 and media guidance data source 618, but only one of each is shown in FIG. 6 to avoid overcomplicating the drawing. (The different types of each of these sources are discussed below.) If desired, content source 616 and media guidance data source 618 may be integrated as one source device. Although communications between sources 616 and 618 with user equipment devices 602, 604, and 606 are shown as through communications network 614, in some embodiments, sources 616 and 618 may communicate directly with user equipment devices 602, 604, and 606 via communication paths (not shown) such as those described above in connection with paths 608, 610, and 612.

Content source 616 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content source 616 may include cable sources, satellite providers, on-demand providers, Internet providers, over-the-top content providers, or other providers of content. Content source 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 618 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 618 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 618 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 618 may provide user equipment devices 602, 604, and 606 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., media guidance data source 618) running on control circuitry of the remote server. When executed by control circuitry of the remote server (such as media guidance data source 618), the media guidance application may instruct the control circuitry to generate the guidance application displays and transmit the generated displays to the user equipment devices. The server application may instruct the control circuitry of the media guidance data source 618 to transmit data for storage on the user equipment. The client application may instruct control circuitry of the receiving user equipment to generate the guidance application displays.

Content and/or media guidance data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include one or more content sources 616 and one or more media guidance data sources 618. In addition or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 5.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 7:
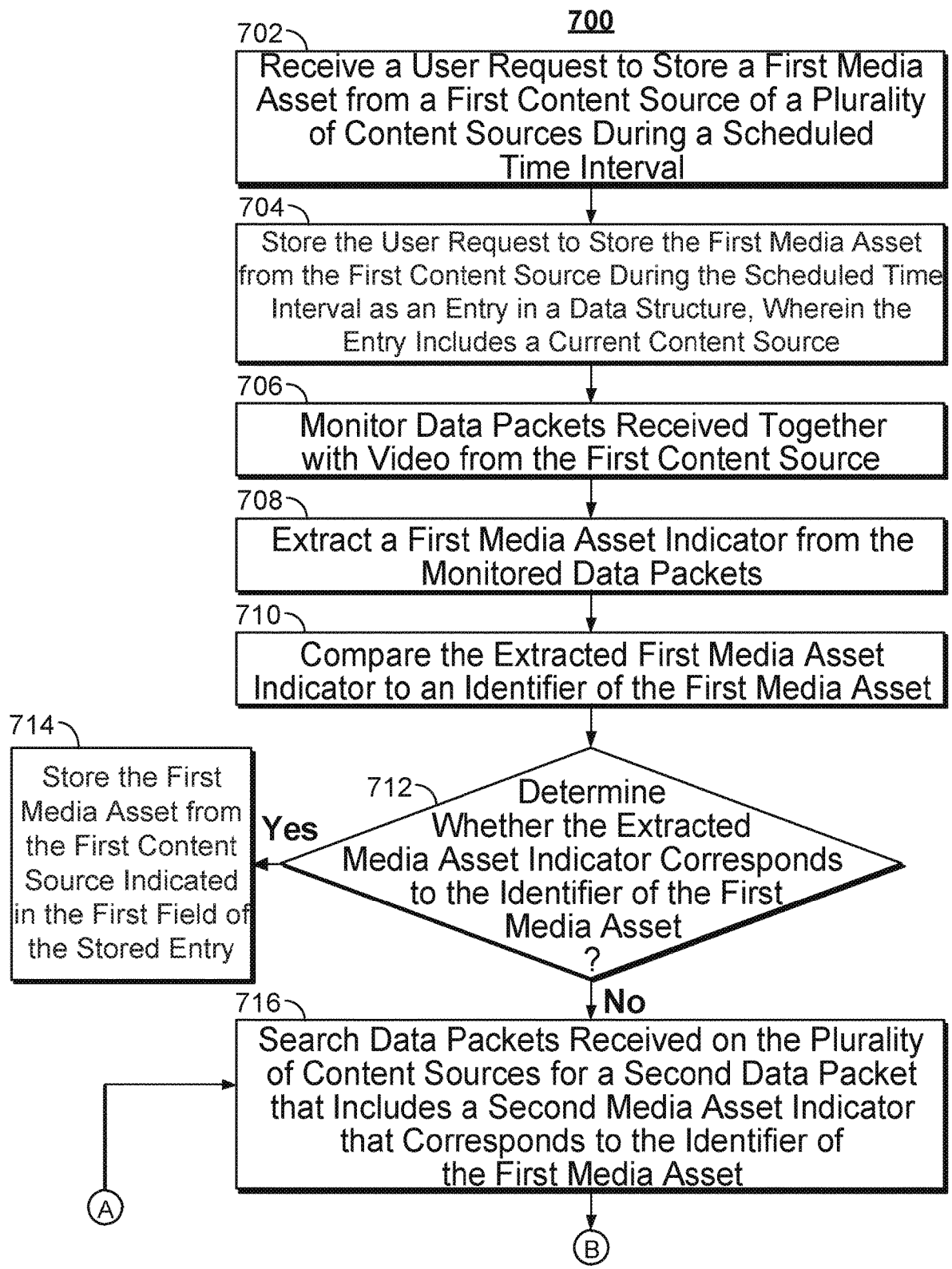
FIG. 7 is another flowchart of illustrative steps for determining that a media asset scheduled to be stored from one content source has been rescheduled for transmission from another content source, in accordance with some embodiments of the disclosure.
Figure 7:
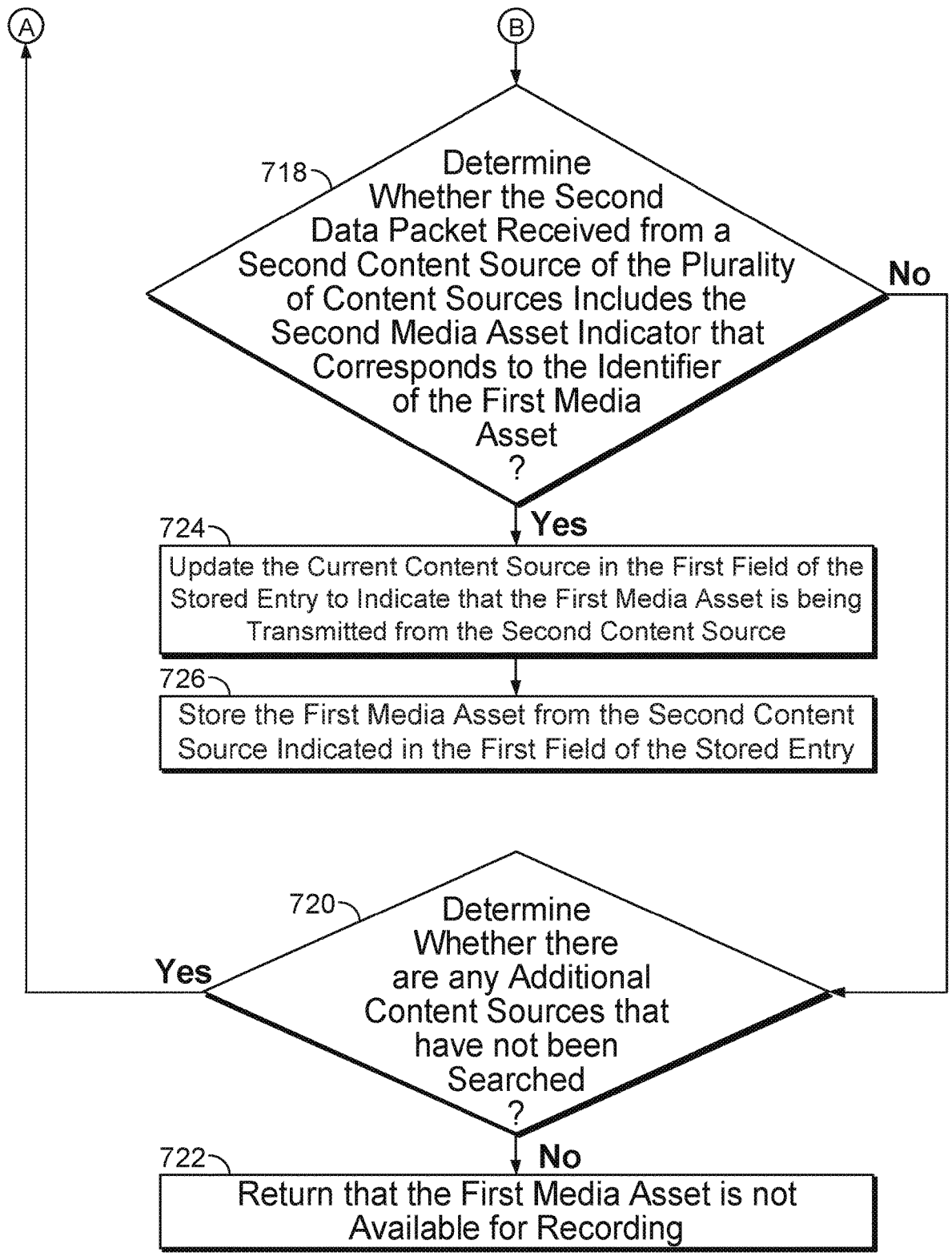

FIG. 7 is another flowchart of illustrative steps for adjusting output of media assets based on user preferences, in accordance with some embodiments of the disclosure. For example, a media guidance application implementing process 700 may be executed by control circuitry 504 (FIG. 5). It should be noted that process 700 or any step thereof could be performed on, or provided by, any of the devices shown in FIGS. 5-6.

Process 700 begins at 702, where the media guidance application receives (e.g., via control circuitry 504 (FIG. 5)) a user request to store a first media asset from a first content source of a plurality of content sources during a scheduled time interval. For example, the media guidance application (e.g., via control circuitry 504 (FIG. 5)) may receive a user selection of an option to store a particular football game "Michigan v. USC" via a user input interface (e.g., via user input interface 510 (FIG. 5)) from the channel "ESPN" from 4-6 pm. The user may select the option to store the football game in a program listing screen (e.g., in a grid guide (FIGS. 3-4)), through a series recording option for all football games of a specific team, remotely from the set-top box using a mobile device, or any other method for selecting programs to be stored.

Process 700 continues to 704, where the media guidance application stores (e.g., in storage 508 (FIG. 5)) the user request to store the first media asset from the first content source during the scheduled time interval as an entry in a data structure, wherein the entry includes a first field indicating a current content source. For example, the media guidance application (e.g., via control circuitry 504 (FIG. 5)) may maintain a database of media assets and scheduled intervals when the media assets are scheduled for transmission that the user has requested to store, which may be located locally in storage (e.g., in storage 508 (FIG. 5)) or remotely (e.g., in media guidance data source 618 (FIG. 6)) accessible via a communications network (e.g., via communications network 614 (FIG. 6)). As a specific example, the database may be arranged as a table where each row contains in separate cells (i.e., fields) an identifier of the media asset scheduled for storage, a start time, an end time, and a content source the media asset is available from (i.e., the current content source). The media guidance application may read/write this information by executing (e.g., via control circuitry 504 (FIG. 5)) a database query language script, such as an SQL script. For example, the media guidance application may update (e.g., via control circuitry 504 (FIG. 5)) the field containing the current content source to be a different content source if the media guidance application determines the first media asset was rescheduled to the different content source, as described further below.

Process 700 continues to 706, where the media guidance application monitors (e.g., via control circuitry 504 (FIG. 5)) data packets received together with video from the first content source. For example, the media guidance application (e.g., via control circuitry 504 (FIG. 5)) may execute a program script to check data packets received from the first content source (e.g., ESPN) to determine whether the football game is currently available from the first content source (e.g., the football game is airing on ESPN). The media guidance application (e.g., via control circuitry 504 (FIG. 5)) may monitor the data packets continuously, or during predetermined intervals to reduce computational cost.

In some embodiments, the media guidance application monitors (e.g., via control circuitry 504 (FIG. 5)) data packets received from the first content source outside of the scheduled time interval as described in FIG. 1. The media guidance application may then determine (e.g., via control circuitry 504 (FIG. 5)) whether the media asset scheduled to be stored has run longer than its scheduled timeslot, and/or started before its scheduled timeslot. The media guidance application, during a first time interval outside of the scheduled time interval, monitors (e.g., via control circuitry 504 (FIG. 5)) the data packets received together with the video from the first content source. For example, the media guidance application may monitor (e.g., via control circuitry 504 (FIG. 5)) the data packets received with the video from the first content source at a set time before the program is scheduled to begin, which may be user-customizable (e.g., 30 minutes before the media asset is scheduled to begin). As an illustrative example, the media guidance application may store (e.g., in storage 508 (FIG. 5)) pre-game footage or information if a sporting event scheduled to end before the scheduled first media asset ends earlier than expected.

Alternatively or additionally, the media guidance application monitors (e.g., via control circuitry 504 (FIG. 5)) the data packets received with the video from the first content source after the scheduled end time of the media asset. For example, the first media asset scheduled to be stored may itself run past the scheduled end time. In this situation, the media guidance application may continue to monitor (e.g., via control circuitry 504 (FIG. 5)) data packets received from the first content source as described above and continue to store the media asset until the data packets received with the video from the first content source no longer match the identifier of the media asset (e.g., indicating that the media asset has ended). Alternatively or additionally, the media guidance application may determine (e.g., via control circuitry 504 (FIG. 5)) that the media asset has ended and not been rescheduled to another content source by searching the plurality of content sources as described above at the end or after the scheduled time interval.

Process 700 continues to 708, where the media guidance application extracts (e.g., via control circuitry 504 (FIG. 5)) a first media asset indicator from the monitored data packets. For example, the media guidance application may extract (e.g., via control circuitry 504 (FIG. 5)), by executing an SQL script utilizing the declarative "Select" command, the media asset indicator from a field in a table transmitted in a data packet with the audiovisual data for the media asset. The identifier is unique to the first media asset allowing the media guidance application to differentiate it from other media assets, and it may be a name of the media asset, or an automatically hashed integer based on the scheduled transmission time from the content source. In some embodiments, the media guidance application (e.g., via control circuitry 504 (FIG. 5)) receives a table containing information related to the video from the first content source. For example, the table may be organized into rows containing metadata relating to the program currently being received from a first content source, such as an indicator of the program (e.g., a unique alphanumeric code corresponding to the program) and a description of the program, as described further below in FIG. 2. The media guidance application then may retrieve a value from a field in the table corresponding to the first media asset indicator. For example, as described above, the media guidance application may retrieve an indicator, such as "FTBL1485."

Process 700 continues to 710, where the media guidance application compares (e.g., via control circuitry 504 (FIG. 5)) the extracted first media asset indicator to an identifier of the first media asset. For example, the media guidance application may access (e.g., via control circuitry 504 (FIG. 5)) a database containing identifiers of media assets, (e.g., stored locally in memory (e.g., storage 508), or remotely at a media guidance data source (e.g., media guidance data source 618) accessible via a communications network (e.g., communications network 614)) and determine (e.g., via character matching) whether the media asset indicator extracted from the media asset stream matches an identifier of the first media asset stored in the database.

In some embodiments, the media guidance application stores (e.g., via control circuitry 504 (FIG. 5)), with the user request, the identifier of the first media asset. For example, when the media guidance application receives (e.g., via control circuitry 504 (FIG. 5)) a user selection (e.g., from user input interface 510 (FIG. 5)) to store the football game, the media guidance application stores an identifier of the football game which may be from the content source providing the football game. The media guidance application may compare (e.g., via control circuitry 504 (FIG. 5)) the characters of the identifier of the first media asset with the characters of the extracted first media asset indicator. For example, the media guidance application may compare (e.g., via control circuitry 504 (FIG. 5)) each character of the extracted indicator, such as "FTBL1485," with the stored identifier. The media guidance application may determine (e.g., via control circuitry 504 (FIG. 5)) that the extracted indicator matches the stored identifier if a threshold number or percentage of characters match.

Process 700 continues to 712, where the media guidance application determines (e.g., via control circuitry 504 (FIG. 5)) whether the extracted media asset indicator corresponds to the identifier of the first media asset. For example, the media guidance application may execute (e.g., via control circuitry 504 (FIG. 5)) a program script which outputs whether the extracted indicator matches the stored identifier of the first media asset (e.g., "FTBL1485" is both the extracted indicator and the stored identifier). The media guidance application may receive (e.g., via control circuitry 504 (FIG. 5)) as an output of the executed program script a Boolean result based on whether the extracted indicator matches the stored identifier.

If the media guidance application determines the extracted media asset indicator corresponds to the identifier of the first media asset, process 700 continues to 714, where the media guidance application stores (e.g., via control circuitry 504 (FIG. 5)) the first media asset from the first content source indicated in the first field of the stored entry. For example, upon determining that the extracted identifier matches the stored identifier corresponding to the first media asset, the media guidance application may store (e.g., in storage 508 (FIG. 5)) the football game received from the originally-scheduled content source (e.g., ESPN), as indicated in the first field of the stored entry. The media guidance application may continue to monitor (e.g., via control circuitry 504 (FIG. 5)) data packets received from the first content source throughout the scheduled time interval to determine whether the first media asset is no longer being transmitted from the first content source and is being transmitted from a different content source (e.g., process 700 may return to step 706).

If the media guidance application determines the extracted media asset indicator does not correspond to the identifier of the first media asset, process 700 continues to 716, where the media guidance application searches (e.g., via control circuitry 504 (FIG. 5)) data packets received on the plurality of content sources for a second data packet that includes a second media asset indicator that corresponds to the identifier of the first media asset. For example, the media guidance application may determine (e.g., via control circuitry 504 (FIG. 5)) that the football game scheduled to air at 4 pm on ESPN is not currently airing based on the extracted indicator from the media asset currently received from ESPN not matching the identifier of the football game (e.g., based on comparison with the database as described above). In response to this determination, the media guidance application may scan through other content sources (e.g., via control circuitry 504 (FIG. 5)) to which the user subscribes in an attempt to find a content source where the media asset is available by extracting indicators from data packets and comparing the extracted indicators to the identifier of the media asset, as described above.

Process 700 continues to 718, where the media guidance application determines (e.g., via control circuitry 504 (FIG. 5)) whether the second data packet received from a second content source of the plurality of content sources includes the second media asset indicator that corresponds to the identifier of the first media asset. For example, the media guidance application may extract (e.g., via control circuitry 504 (FIG. 5)) a media asset indicator (e.g., "FTBL1485") from a data packet received from the second content source and determine whether it matches (e.g., via character matching) the identifier of the first media asset stored in a data structure, as described above.

If the media guidance application determines the second data packet received from a second content source of the plurality of content sources includes the second media asset indicator that corresponds to the identifier of the first media asset, process 700 continues to 724, where the media guidance application updates (e.g., via control circuitry 504 (FIG. 5)) the current content source in the first field of the stored entry to indicate that the first media asset is being transmitted from the second content source. For example, upon determining from the extracted data packets from the content source "ESPN2" that the football game is airing on ESPN2 instead of ESPN, the media guidance application may update (e.g., via control circuitry 504 (FIG. 5)) the field corresponding to the current content source in the entry stored in the data structure to reflect that the football game is airing from the different content source, ESPN2. As a specific example, the media guidance application may execute (e.g., via control circuitry 504 (FIG. 5)) a program script to update the value stored in the first field a content source field associated with the stored entry for the football game.

Process 700 then continues to 726 where the media guidance application stores (e.g., in storage 508 (FIG. 5)) the first media asset received from the second content source indicated in the first field of the stored entry as the current content source. For example, the media guidance application may store (e.g., in storage 508 (FIG. 5)) the football game from ESPN2 instead of ESPN based on the updated current content source value stored in the first field of the entry in the database. In some embodiments, the media guidance application may continue to monitor (e.g., via control circuitry 504 (FIG. 5)) the data packets of the media asset currently being received from the second content source to determine whether the first media asset has been scheduled back to the first content source, or another content source. For example, the reason the football game was rescheduled to ESPN2 may be because a sporting event on ESPN scheduled to end at 4 pm ran long. In this situation, while storing (e.g., in storage 508 (FIG. 5)) the first media asset from the second content source (e.g., the football game from ESPN2) the media guidance application may continue to monitor (e.g., via control circuitry 504 (FIG. 5)) whether the football game is still being received from ESPN2. After ten minutes, the game on ESPN may finish and the "Michigan v. USC" football game may be scheduled back to ESPN from ESPN2. By continuing to monitor the media asset indicator received with the audiovisual data of the media asset during the scheduled time interval, the media guidance application can detect (e.g., via control circuitry 504 (FIG. 5)) a content source change at any time and find and store the media asset from the content source on which it is currently available.

In some embodiments, the media guidance application may store (e.g., in storage 508 (FIG. 5)) the media asset in multiple segments from different content sources. For example, the football game may begin on ESPN2, but be moved to ESPN after five minutes because the program that ran long on ESPN is over. In such a situation, the media guidance application may store (e.g., in storage 508 (FIG. 5)) a first segment of the media asset from the second content source, as discussed above. For example, the media guidance application may store (e.g., in storage 508 (FIG. 5)) the football game received from ESPN2 at the start of the game, instead of ESPN as originally scheduled. The media guidance application then may store (e.g., in storage 508 (FIG. 5)) a second segment of the first media asset received from the first content source. For example, the media guidance application may determine, as discussed above (e.g., step 718), that the football game has been scheduled back to ESPN and may store (e.g., in storage 508 (FIG. 5)) a second segment of the football game received from ESPN. The media guidance application then stitches (e.g., via control circuitry 504 (FIG. 5)), into a single stored file, the first segment and the second segment. For example, the media guidance application combines (e.g., via control circuitry 504 (FIG. 5)) the two stored segments of the football game such that a single stored file for the entire game can be accessed by the user. The media guidance application additionally stores (e.g., in storage 508 (FIG. 5)), in the single stored file, an indication that the single stored file was created from the first content source and the second content source. For example, the media guidance application may store (e.g., in storage 508 (FIG. 5)) the indication that the stored file was made from multiple content sources so that the user is alerted to that fact.

In some embodiments, when stitching together two stored segments, the media guidance application extracts (e.g., via control circuitry 504 (FIG. 5)) a first time stamp for the first segment from metadata stored with the first segment. For example, the media guidance application may extract (e.g., via control circuitry 504 (FIG. 5)) that the first segment was stored starting at "19:00:00" (HH:MM:SS). The media guidance application extracts (e.g., via control circuitry 504 (FIG. 5)) a second time stamp for the second segment from metadata stored with the second segment. For example, the media guidance application may extract (e.g., via control circuitry 504 (FIG. 5)) that the second segment was stored starting at "19:05:00" (HH:MM:SS). The media guidance application then compares (e.g., via control circuitry 504 (FIG. 5)) the first time stamp and the second time stamp to determine which is earlier. For example, the media guidance application may determine (e.g., via control circuitry 504 (FIG. 5)) based on subtracting the two extracted time stamps which is earlier based on whether the result obtained from the subtraction is positive or negative. The media guidance application, in response to determining the first time stamp is earlier, adds (e.g., via control circuitry 504 (FIG. 5)) the second segment to the end of the first segment. For example, the media guidance application stitches (e.g., via control circuitry 504 (FIG. 5)) the beginning of the second segment stored from ESPN to the end of the first segment stored from ESPN2 of the football game.

If the media guidance application determines the second data packet received from a second content source of the plurality of content sources does not include the second media asset indicator that corresponds to the identifier of the first media asset, process 700 continues to 720, where the media guidance application determines (e.g., via control circuitry 504 (FIG. 5)) whether there are any additional content sources that have not been searched. For example, the media guidance application may execute (e.g., via control circuitry 504 (FIG. 5)) a program script containing a "for" loop that iteratively receives data packets containing media asset indicators from content sources that the user subscribes to and terminates when data packets containing media asset indicators from all the content sources have been checked. Alternatively or additionally, the media guidance application may maintain a list of content sources (e.g., in storage 508 (FIG. 5)) that data packets have been extracted from and determine whether any content sources subscribed to by the user have not yet been checked.

If the media guidance application determines there are not any additional content sources that have not been searched, process 700 continues to 722, where the media guidance application returns (e.g., via control circuitry 504 (FIG. 5)) that the first media asset is not available for recording. For example, the media guidance application may determine (e.g., via control circuitry 504 (FIG. 5)) that the football game is not being transmitted from any content source available to the user. Alternatively or additionally, upon making the determination that the football game is not being transmitted from any content source available to the user, the media guidance application may transmit (e.g., via communications network 614 (FIG. 6)) a notification to the user that the football game cannot be stored due to a schedule change.

If the media guidance application determines there are additional content sources that have not been searched, process 700 returns to 716, where the media guidance application searches (e.g., via control circuitry 504 (FIG. 5)) data packets received on the plurality of content sources that have not been searched for a second data packet that includes a second media asset indicator that corresponds to the identifier of the first media asset. For example, the media guidance application may continue to search (e.g., via control circuitry 504 (FIG. 5)) data packets received from different content sources for a media asset indicator that corresponds to the stored identifier of the football game, as described above.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. For example, multiple instances of process 700 may be executed for multiple tuners in a set-top box which are each scheduled to receive different media assets for storage. Furthermore, it should be noted that any of the devices or equipment discussed in relation to FIGS. 5-6 could be used to perform one or more of the steps in FIG. 7.

Figure 8:
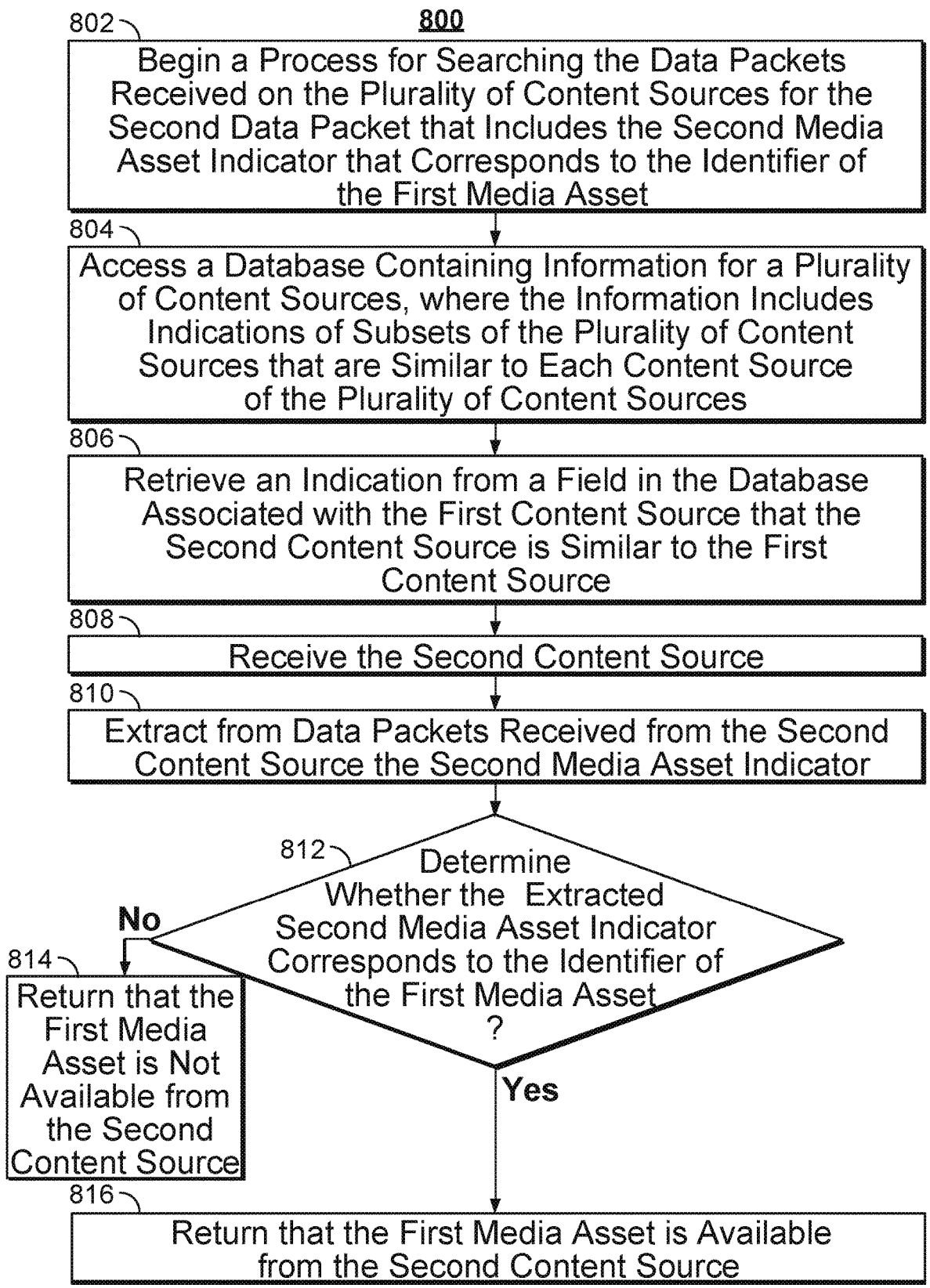
FIG. 8 is a flowchart of illustrative steps for searching data packets received from a plurality of content sources, in accordance with some embodiments of the disclosure.

FIG. 8 is a flowchart of illustrative steps for searching data packets received from a plurality of content sources, in accordance with some embodiments of the disclosure. For example, a media guidance application implementing process 800 may be executed by control circuitry 504 (FIG. 5). It should be noted that process 800 or any step thereof could be performed on, or provided by, any of the devices shown in FIGS. 5-6. Process 800 starts with 802, where the media guidance application begins a process for searching the data packets received on the plurality of content sources for the second data packet that includes the second media asset indicator that corresponds to the identifier of the first media asset. For example, the media guidance application may initialize the necessary variables and execute (e.g., via control circuitry 504 (FIG. 5)) a program script calling a particular method to execute process 800.

Process 800 continues to 804, where the media guidance application accesses (e.g., via control circuitry 504 (FIG. 5)) a database containing information for a plurality of content sources, where the information includes indications of subsets of the plurality of content sources that are similar to each content source of the plurality of content sources. For example, the media guidance application may access the database stored locally in memory (e.g., storage 508 (FIG. 5)) or remotely at a media guidance data source (e.g., media guidance data source 618 (FIG. 6)) accessible via a communications network (e.g., communications network 614 (FIG. 6)). The database may be designed in a self-referencing manner, where identifiers and information for each content source may be contained non-contiguously in a single table and linked via pointers to the appropriate fields corresponding to similar content sources in the table.

Process 800 continues to 806, where the media guidance application retrieves (e.g., via control circuitry 504 (FIG. 5)) an indication from a field in the database associated with the first content source that the second content source is similar to the first content source. For example, the media guidance application may execute (e.g., via control circuitry 504 (FIG. 5)) a database query language script, such as an SQL script, which retrieves, (e.g., via the declarative "Select" statement) an identifier of a second content source from a field associated with the first content source. The identifier may be any combination of alphanumeric or other characters that uniquely identify the content source. For example, the identifier may be the frequency (e.g., 54 MHz), call sign of an OTA channel (e.g., WXYZ), or the identifier may be the name of the channel (e.g., ESPN).

Process 800 continues to 808, where the media guidance application receives (e.g., via control circuitry 504 (FIG. 5)) the second content source. For example, as described above, the media guidance application may receive media asset information data packets (e.g., as shown in FIG. 2) from a second content source in order to determine what media asset is currently being transmitted by the second content source.

Process 800 continues to 810, where the media guidance application extracts (e.g., via control circuitry 504 (FIG. 5)) from data packets received from the second content source the second media asset indicator. As described above in FIGS. 1 and 6, the media guidance application may extract (e.g., via control circuitry 504 (FIG. 5)) a second media asset indicator from data packets received from the second content source to determine what media asset is currently being transmitted from the second content source. For example, the media guidance application may extract (e.g., via control circuitry 504 (FIG. 5)) the indicator, "Soccer123."

Process 800 continues to 812, where the media guidance application determines (e.g., via control circuitry 504 (FIG. 5)) whether the extracted second media asset indicator corresponds to the identifier of the first media asset. As described above in FIGS. 1 and 7, the media guidance application compares (e.g., via control circuitry 504 (FIG. 5)) the extracted indicator (e.g., "Soccer123") with an identifier of the first media asset that the user requested to store. For example, the media guidance application may compare (e.g., via control circuitry 504 (FIG. 5)) characters of the extracted indicator "Soccer123" with characters of the stored identifier "Football678" and determine whether a threshold number of characters match.

If the extracted second media asset indicator does not correspond to the identifier of the first media asset, process 800 continues to 814, where the media guidance application returns (e.g., via control circuitry 504 (FIG. 5)) that the first media asset is not available from the second content source. For example, if the media guidance application determines (e.g., via control circuitry 504 (FIG. 5)) a threshold number of characters do not match between the second media asset indicator and the identifier of the first media asset, the media guidance application may return that the media asset is not available from the second content source. The media guidance application may return to step 804 and determine (e.g., via control circuitry 504 (FIG. 5)) whether all content sources have been checked to determine whether data packets received from those content sources indicate that the first media asset is currently being transmitted. The media guidance application may execute a program script to loop (e.g., via control circuitry 504 (FIG. 5)) through process 800 until each content source associated with the first content source has been checked, or until all content sources available to the user have been checked.

If the extracted second media asset indicator corresponds to the identifier of the first media asset, process 800 continues to 816, where the media guidance application returns (e.g., via control circuitry 504 (FIG. 5)) that the first media asset is available from the second content source. For example, if the media guidance application determines (e.g., via control circuitry 504 (FIG. 5)) a threshold number of characters match between the second media asset indicator and the identifier of the first media asset, the media guidance application may return that the media asset not available from the second content source. The media guidance application may then terminate (e.g., via control circuitry 504 (FIG. 5)) process 800 and execute a new process to record the first media asset from the second content source.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. For example, multiple instances of process 800 may be executed such that multiple tuners in a set-top box each receive different content sources in parallel. This allows the media guidance application to check multiple content sources associated with the first content source in parallel to determine whether the first media asset is being transmitted from those content sources. Furthermore, it should be noted that any of the devices or equipment discussed in relation to FIGS. 5-6 could be used to perform one or more of the steps in FIG. 8.

Figure 9:
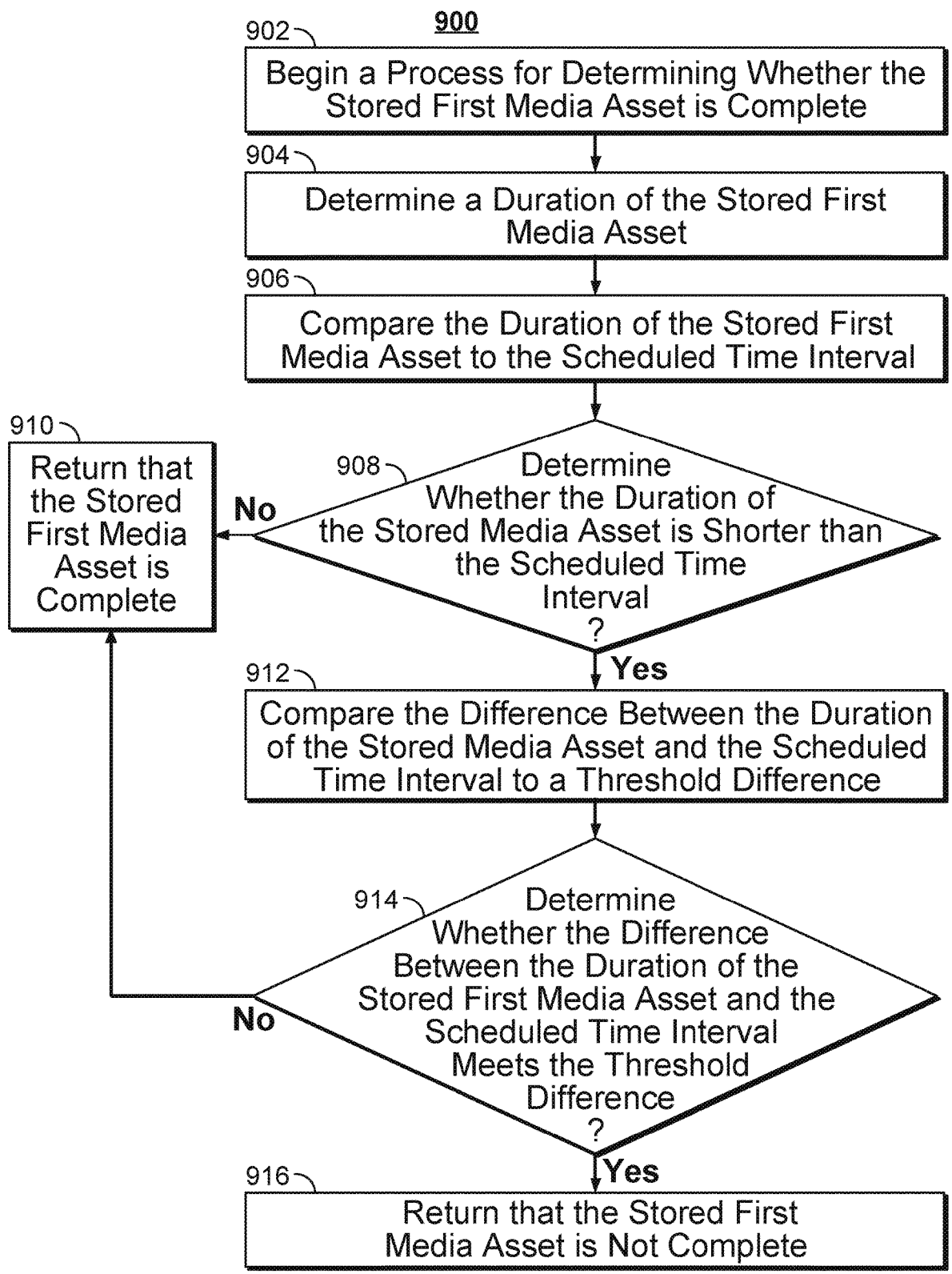
FIG. 9 is a flowchart of illustrative steps for determining whether a stored media asset is a complete version of the media asset, in accordance with some embodiments of the disclosure.

FIG. 9 is a flowchart of illustrative steps for determining whether a stored media asset is a complete version of the media asset, in accordance with some embodiments of the disclosure. For example, a media guidance application implementing process 900 may be executed by control circuitry 504 (FIG. 5). It should be noted that process 900 or any step thereof could be performed on, or provided by, any of the devices shown in FIGS. 5-6. Process 900 starts with 902, where the media guidance application begins a process for determining whether the stored first media asset is complete. For example, the media guidance application may initialize the necessary variables and execute (e.g., via control circuitry 504 (FIG. 5)) a program script calling a particular method to execute process 900.

Process 900 continues to 904, where the media guidance application determines (e.g., via control circuitry 504 (FIG. 5)) a duration of the stored first media asset. For example, the media guidance application may retrieve (e.g., via control circuitry 504 (FIG. 5)) metadata stored (e.g., in storage 508 (FIG. 5)) with the stored first media asset the value stored in a "program_length" variable, which may be "7100 seconds." Alternatively or additionally, the media guidance application may retrieve (e.g., via control circuitry 504 (FIG. 5)) the start time when the first media asset first was stored and the end time when it ceased being stored by the media guidance application and calculate the duration via subtracting the two values.

Process 900 continues to 906, where the media guidance application compares (e.g., via control circuitry 504 (FIG. 5)) the duration of the stored first media asset to the scheduled time interval. For example, the media guidance application may subtract (e.g., via control circuitry 504 (FIG. 5)) the duration of the stored first media asset from the length of the scheduled time interval. As a specific example, if the duration of the stored first media asset is 7100 seconds and the length of the scheduled time interval is 7200 seconds, the media guidance application may determine (e.g., via control circuitry 504 (FIG. 5)) that the stored first media asset is 100 seconds shorter than the scheduled time interval, which may indicate a portion of the first media asset was not stored.

Process 900 continues to 908, where the media guidance application determines (e.g., via control circuitry 504 (FIG. 5)) whether the duration of the stored media asset is shorter than the scheduled time interval. For example, as described above, the media guidance application may calculate (e.g., via control circuitry 504 (FIG. 5)) a positive value as a result of the subtraction of the duration of the stored first media asset from the length of the scheduled time interval if the stored first media asset is short. Conversely, if the value is negative, the stored first media asset is longer than the scheduled time interval, likely indicating that the first media asset was correctly stored in its entirety. In some embodiments, an actual duration of the first media asset may be received (e.g., via control circuitry 504 (FIG. 5)) by the media guidance application from the first (and/or second) content source which can be used to make a more accurate comparison and determination, as described above.

If the media guidance application determines that the duration of the stored media asset is not shorter than the scheduled time interval, process 900 continues to 910, where the media guidance application returns (e.g., via control circuitry 504 (FIG. 5)) that the stored first media asset is complete. For example, if the value calculated by the media guidance application is negative as described above, the media guidance application may return (e.g., via control circuitry 504 (FIG. 5)) that the stored first media asset is complete and terminate process 900.

If the media guidance application determines that the duration of the stored media asset is shorter than the scheduled time interval, process 900 continues to 912, where the media guidance application compares (e.g., via control circuitry 504 (FIG. 5)) the difference between the duration of the stored media asset and the scheduled time interval to a threshold difference. For example, the media guidance application may retrieve (e.g., via control circuitry 504 (FIG. 5)) a value stored in a user profile corresponding to the threshold difference. The threshold difference may be adjustable by the user, such that the user determines what fraction of a media asset is acceptable to be missing from a stored media asset before determining that the stored media asset is missing essential amounts of content (e.g., it is not complete). As a specific example, the media guidance application may retrieve (e.g., via control circuitry 504 (FIG. 5)) the threshold difference "60 seconds." The media guidance application may then compare (e.g., via control circuitry 504 (FIG. 5)) the threshold difference (e.g., 60 seconds) to the difference determined above in step 906 (e.g., 100 seconds).

Process 900 continues to 914, where the media guidance application determines (e.g., via control circuitry 504 (FIG. 5)) whether the difference between the duration of the stored first media asset and the scheduled time interval meets the threshold difference. For example, the media guidance application may subtract (e.g., via control circuitry 504 (FIG. 5)) the threshold difference from the difference determined in step 906 to determine whether the value is positive or negative. If the media guidance application calculates a negative value, then the media guidance application may determine (e.g., via control circuitry 504 (FIG. 5)) that threshold difference is not met. If the media guidance application calculates a positive or zero value, then the media guidance application may determine (e.g., via control circuitry 504 (FIG. 5)) that the threshold difference is met.

If the media guidance application determines that the difference between the duration of the stored first media asset and the scheduled time interval does not meet the threshold difference, process 900 continues to 910, where the media guidance application returns (e.g., via control circuitry 504 (FIG. 5)) that the stored first media asset is complete. For example, if the value calculated by the media guidance application does not meet the threshold difference as described above, the media guidance application may return (e.g., via control circuitry 504 (FIG. 5)) that the stored first media asset is complete and terminate process 900.

If the media guidance application determines that the difference between the duration of the stored first media asset and the scheduled time interval meets the threshold difference, process 900 continues to 910, where the media guidance application returns (e.g., via control circuitry 504 (FIG. 5)) that the stored first media asset is not complete. For example, if the value calculated by the media guidance application meets the threshold difference as described above, the media guidance application may return (e.g., via control circuitry 504 (FIG. 5)) that the stored first media asset is not complete and may terminate process 900.

In some embodiments, in response to determining the difference between the duration of the stored media asset and the scheduled time interval meets the threshold difference, the media guidance application additionally determines (e.g., via control circuitry 504 (FIG. 5)), from media asset listings retrieved from a media guidance database (e.g., from media guidance data source 618 (FIG. 6)), whether the first media asset is available at a future time. For example, the media guidance application may determine (e.g., via control circuitry 504 (FIG. 5)) that a portion of the football game (e.g., one hour) may not have been stored which exceeds the threshold (e.g., five minutes), and then retrieve listings from a media guidance data source to determine whether a media asset is available at a future time (e.g., a re-run). The media guidance application may compare (e.g., via control circuitry 504 (FIG. 5)) the characters of the identifier of the media asset with individual listings to make the determination that the media asset is available at a future time. The media guidance application, in response to determining the first media asset is available at a future time from a third content source, stores a second request (e.g., via control circuitry 504 (FIG. 5)) to store the first media asset from the third content source (e.g., in a data structure such as a table, as discussed above in FIG. 7). For example, the media guidance application may determine (e.g., via control circuitry 504 (FIG. 5)) that the media asset is available from a third content source, which may be the first, second, or a different content source, and schedule a request to store the media asset from the third content source (e.g., ABC). By scheduling the re-run of the media asset, the media guidance application may be able to determine (e.g., via control circuitry 504 (FIG. 5)) whether the original stored media asset was complete (e.g., it ended earlier than its scheduled interval) or whether it was missing a portion of the media asset.

In some embodiments, the media guidance application stores only a portion of the media asset scheduled at a future time. The media guidance application retrieves (e.g., via control circuitry 504 (FIG. 5)), from metadata stored for each frame of a plurality of frames of the stored media asset, times associated with each frame of the plurality of frames. For example, each frame received and stored by the media guidance application may have associated metadata with a time the frame was transmitted from the content source (e.g., in the format HH:MM:SS:FF, where FF is the frame number). The media guidance application may determine (e.g., via control circuitry 504 (FIG. 5)) that a portion of the first media asset is missing between a first frame and a second frame. For example, the media guidance application may detect that after a frame with an associated time 19:05:00:01, the next frame has an associated time 19:10:00:01, and the media guidance application may determine (e.g., via control circuitry 504 (FIG. 5)) that a portion (e.g., five minutes of the media asset) is missing from the stored media asset. The media guidance application may then store (e.g., in storage 508 (FIG. 5)), with the second request, an instruction to only store the first portion of the first media asset. For example, in order to create a complete version of the media asset without storing the whole media asset over again, which may be storage intensive, the media guidance application stores an instruction to only store the frames of the media asset that are missing from the stored first media asset (e.g., the first portion).

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. For example, multiple instances of process 900 may be executed such that multiple stored media assets are checked for completeness in parallel. Furthermore, it should be noted that any of the devices or equipment discussed in relation to FIGS. 5-6 could be used to perform one or more of the steps in FIG. 9.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for determining that a media asset scheduled to be stored from one content source has been rescheduled for transmission from another content source, the method comprising:

receiving a user request to store the media asset from a first content source of a plurality of content sources, wherein the media asset is scheduled for transmission from the first content source during a scheduled time interval;

storing the user request to store the media asset from the first content source during the scheduled time interval as an entry in a data structure, wherein the entry includes a first field indicating a current content source;

in response to determining a current time corresponds to a time during the scheduled time interval:

monitoring, via processing circuitry, data packets received together with video via a network from the first content source;

extracting a first media asset indicator from the monitored data packets;

comparing the extracted first media asset indicator to an identifier of the media asset to determine if a media asset corresponding to the extracted first media asset indicator matches the media asset scheduled to be stored;

in response to determining that the extracted first media asset indicator does not correspond to the identifier of the media asset, searching data packets received from the plurality of content sources for a second data packet that includes a second media asset indicator that corresponds to the media asset scheduled to be stored, wherein the media asset is available from a second content source different from the first content source;

in response to determining that the second data packet received from a second content source of the plurality of content sources includes the second media asset indicator that corresponds to the identifier of the media asset and in response to determining that the extracted media asset indicator, extracted during the scheduled time interval, does not correspond to the identifier of the media asset, updating the current content source in the first field of the stored entry to indicate that the media asset is being transmitted from the second content source; and storing, at a storage device, a first segment of the media asset from the second content source indicated in the first field of the stored entry and a second segment of the media asset received from the first content source;

extracting a first time stamp for the first segment from metadata stored with the first segment and a second time stamp for the second segment from metadata stored with the second segment; and stitching, into a single stored file, the first segment and the second segment based on the first timestamp and the second timestamp.

2. The method of claim 1, further comprising:

during a first time interval outside of the scheduled time interval:

monitoring the data packets received together with the video from the first content source;

extracting the first media asset indicator from the monitored data packets; and comparing the extracted first media asset indicator to the identifier of the first media asset;

in response to determining the extracted first media asset indicator corresponds to the identifier of the media asset, storing the media asset from the first content source indicated in the first field of the stored entry.

3. The method of claim 1, wherein searching the data packets received on the plurality of content sources for the second data packet that includes the second media asset indicator that corresponds to the identifier of the media asset comprises:

accessing a database containing information for a plurality of content sources, wherein the information includes indications of subsets of the plurality of content sources that are similar to each content source of the plurality of content sources;

retrieving an indication from a field in the database associated with the first content source that the second content source is similar to the first content source; and searching data packets from the second content source for the second media asset indicator that corresponds to the identifier of the media asset.

4. The method of claim 1, wherein extracting the first media asset indicator from the monitored data packets comprises:

receiving a table containing information related to the video from the first content source; and retrieving a value from a field in the table corresponding to the first media asset indicator.

5. The method of claim 1, wherein comparing the extracted first media asset indicator to the identifier of the media asset comprises:

storing, with the user request, the identifier of the media asset; and comparing the characters of the identifier of the media asset with the characters of the extracted first media asset indicator.

6. The method of claim 1, wherein stitching, into the single stored file, the first segment and the second segment comprises:

comparing the first time stamp and the second time stamp to determine which is earlier; and in response to determining the first time stamp is earlier, adding the second segment to the end of the first segment.

7. The method of claim 1, further comprising:

comparing a duration of the stored media asset to the scheduled time interval;

in response to determining the duration of the stored media asset is shorter than the scheduled time interval:

comparing the difference between the duration of the stored media asset and the scheduled time interval to a threshold difference; and in response to determining the difference between the duration of the stored media asset and the scheduled time interval meets the threshold difference, determining that the stored media asset is not complete.

8. The method of claim 7, further comprising:

in response to determining the difference between the duration of the stored media asset and the scheduled time interval meets the threshold difference:

determining, from media asset listings retrieved from a media guidance database, whether the media asset is available at a future time; and in response to determining the first media asset is available at a future time from a third content source, storing a second request to store the media asset from the third content source.

9. The method of claim 8, wherein storing the second request to store the media asset from the third content source comprises:

retrieving, from metadata stored for each frame of a plurality of frames of the stored media asset, times associated with each frame of the plurality of frames;

determining that a portion of the media asset is missing between a first frame and a second frame; and storing, with the second request, an instruction to only store the first portion of the media asset.

10. A system for determining that a media asset scheduled to be stored from one content source has been rescheduled for transmission from another content source, the system comprising:

storage circuitry;

control circuitry configured to:

receive a user request to store the media asset from a first content source of a plurality of content sources, wherein the media asset is scheduled for transmission from the first content source during a scheduled time interval;

store the user request to store the first media asset from the first content source during the scheduled time interval as an entry in a data structure, wherein the entry includes a first field indicating a current content source;

in response to determining a current time corresponds to a time during the scheduled time interval:

monitor data packets received together with video from the first content source;

extract a first media asset indicator from the monitored data packets;

compare the extracted first media asset indicator to an identifier of the media asset to determine if a media asset corresponding to the extracted first media asset indicator matches the media asset scheduled to be stored;

in response to determining that the extracted first media asset indicator does not correspond to the identifier of the media asset, search data packets received from the plurality of content sources for a second data packet that includes a second media asset indicator that corresponds to the media asset scheduled to be stored, wherein the media asset is available from a second content source different from the first content source;

in response to determining that the second data packet received from a second content source of the plurality of content sources includes the second media asset indicator that corresponds to the identifier of the media asset and in response to determining that the extracted media asset indicator, extracted during the scheduled time interval, does not correspond to the identifier of the first media asset, update the current content source in the first field of the stored entry to indicate that the media asset is being transmitted from the second content source; and store a first segment of the media asset from the second content source indicated in the first field of the stored entry and a second segment of the media asset received from the first content source;

extract a first time stamp for the first segment from metadata stored with the first segment and a second time stamp for the second segment from metadata stored with the second segment; and stitch, into a single stored file, the first segment and the second segment based on the first timestamp and the second timestamp.

11. The system of claim 10, wherein the control circuitry is further configured to:

during a first time interval outside of the scheduled time interval:

monitor the data packets received together with the video from the first content source;

extract the first media asset indicator from the monitored data packets; and compare the extracted first media asset indicator to the identifier of the first media asset;

in response to determining the extracted first media asset indicator corresponds to the identifier of the media asset, store the media asset from the first content source indicated in the first field of the stored entry.

12. The system of claim 10, wherein the control circuitry configured to search the data packets received on the plurality of content sources for the second data packet that includes the second media asset indicator that corresponds to the identifier of the first media asset is further configured to:

access a database containing information for a plurality of content sources, wherein the information includes indications of subsets of the plurality of content sources that are similar to each content source of the plurality of content sources;

retrieve an indication from a field in the database associated with the first content source that the second content source is similar to the first content source; and search data packets from the second content source for the second media asset indicator that corresponds to the identifier of the media asset.

13. The system of claim 10, wherein the control circuitry configured to extract the first media asset indicator from the monitored data packets is further configured to:

receive a table containing information related to the video from the first content source; and retrieve a value from a field in the table corresponding to the first media asset indicator.

14. The system of claim 10, wherein the control circuitry configured to compare the extracted first media asset indicator to the identifier of the media asset is further configured to:

store, with the user request, the identifier of the media asset; and compare the characters of the identifier of the media asset with the characters of the extracted first media asset indicator.

15. The system of claim 10, wherein the control circuitry configured to stitch, into the single stored file, the first segment and the second segment is further configured to:
compare the first time stamp and the second time stamp to determine which is earlier; and
in response to determining the first time stamp is earlier, add the second segment to the end of the first segment.

16. The system of claim 10, wherein the control circuitry is further configured to:
compare a duration of the stored first media asset to the scheduled time interval;
in response to determining the duration of the stored media asset is shorter than the scheduled time interval:
compare the difference between the duration of the stored media asset and the scheduled time interval to a threshold difference; and
in response to determining the difference between the duration of the stored media asset and the scheduled time interval meets the threshold difference, determine that the stored media asset is not complete.

17. The system of claim 16, wherein the control circuitry is further configured to:
in response to determining the difference between the duration of the stored media asset and the scheduled time interval meets the threshold difference:
determine, from media asset listings retrieved from a media guidance database, whether the media asset is available at a future time; and
in response to determining the media asset is available at a future time from a third content source, store a second request to store the media asset from the third content source.

18. The system of claim 17, wherein the control circuitry configured to store the second request to store the media asset from the third content source is further configured to:
retrieve, from metadata stored for each frame of a plurality of frames of the stored media asset, times associated with each frame of the plurality of frames;
determine that a portion of the media asset is missing between a first frame and a second frame; and
store, with the second request, an instruction to only store the first portion of the media asset.

19. The method of claim 1, further comprising:
storing an indication that the single stored file comprises segments from multiple content sources; and
generating for display an alert based on the indication.

20. The system of claim 10, wherein the control circuitry is further configured to:
store an indication that the single stored file comprises segments from multiple content sources; and
generate for display an alert based on the indication.

* * * * *